US011853768B2

(12) United States Patent
Gajulapally et al.

(10) Patent No.: US 11,853,768 B2
(45) Date of Patent: Dec. 26, 2023

(54) LOCKSCREEN FOR HEAD-WORN AUGMENTED REALITY DEVICE

(71) Applicant: Snap Inc., Santa Monica, CA (US)

(72) Inventors: Adithya Gajulapally, Mountain View, CA (US); Jonathan Geddes, Saratoga Springs, UT (US); Hwan Moon Lee, Los Angeles, CA (US); Mathieu Emmanuel Vignau, Los Angeles, CA (US); Aaron Wangugi, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/660,359

(22) Filed: Apr. 22, 2022

(65) Prior Publication Data
US 2023/0342160 A1  Oct. 26, 2023

(51) Int. Cl.
| G06F 9/00 | (2006.01) |
| G06F 9/4401 | (2018.01) |
| G06F 9/445 | (2018.01) |
| G06F 21/35 | (2013.01) |

(52) U.S. Cl.
CPC ............ *G06F 9/4401* (2013.01); *G06F 9/445* (2013.01); *G06F 21/35* (2013.01); *G06F 9/4406* (2013.01)

(58) Field of Classification Search
CPC ......... G06F 9/4401; G06F 9/445; G06F 21/35
USPC .............................................................. 713/2
See application file for complete search history.

(56) References Cited

U.S. PATENT DOCUMENTS

| 9,692,967 | B1 * | 6/2017 | Bamberger .......... H04N 23/631 |
| 10,467,147 | B1 | 11/2019 | Ahmed et al. |
| 10,963,145 | B1 | 3/2021 | Voss et al. |
| 2008/0082828 | A1 * | 4/2008 | Jennings ................. G06F 21/72 726/17 |
| 2014/0087675 | A1 * | 3/2014 | Pedersen .............. H04R 25/554 455/90.3 |
| 2014/0351617 | A1 * | 11/2014 | Connell ................ G06F 1/3265 713/323 |
| 2015/0084864 | A1 | 3/2015 | Geiss et al. |
| 2015/0220134 | A1 * | 8/2015 | Zhou ....................... G06F 1/189 713/320 |
| 2016/0301843 | A1 | 10/2016 | Shultz |

(Continued)

OTHER PUBLICATIONS

"International Application Serial No. PCT US2023 017681, International Search Report dated Jul. 19, 2023", 3 pgs.

(Continued)

*Primary Examiner* — Volvick Derose

(74) *Attorney, Agent, or Firm* — Schwegman Lundberg & Woessner, P.A.

(57) ABSTRACT

A method of activating a head-worn device is disclosed. The method includes activating the head-worn device and performing a partial bootup. When an instruction to perform a function is received, it is determined whether or not the instruction is permitted for partial bootup execution. The instruction is executed based on the instruction being permitted for partial bootup execution, and a bootup of the head-work device is completed based on the instruction not being permitted for partial bootup execution. The method may further comprise determining if the instruction requires user authentication in order to be executed, and based on the instruction being partial bootup compatible and not requiring user authentication, executing the instruction.

17 Claims, 21 Drawing Sheets

(56) References Cited

U.S. PATENT DOCUMENTS

| | | | |
|---|---|---|---|
| 2016/0321002 A1* | 11/2016 | Jung | G06F 12/0246 |
| 2017/0090744 A1 | 3/2017 | Kim | |
| 2017/0277361 A1* | 9/2017 | Schulze | G06F 3/0484 |
| 2018/0102606 A1* | 4/2018 | Tham | H02J 7/0068 |
| 2018/0107813 A1 | 4/2018 | Perotti | |
| 2019/0102096 A1* | 4/2019 | Loewen | G06F 3/0625 |
| 2021/0150014 A1 | 5/2021 | Edwards et al. | |
| 2021/0256133 A1* | 8/2021 | Beck | H04L 9/0861 |
| 2021/0279069 A1* | 9/2021 | Salgaonkar | G06F 9/4406 |
| 2021/0383376 A1* | 12/2021 | Silvestri | G06Q 20/3226 |
| 2022/0164162 A1* | 5/2022 | Ramasubramanian | H04R 3/12 |
| 2023/0033667 A1* | 2/2023 | Koteshwara | G06F 9/4411 |

OTHER PUBLICATIONS

"International Application Serial No. PCT US2023 017681, Written Opinion dated Jul. 19, 2023", 5 pgs.

* cited by examiner

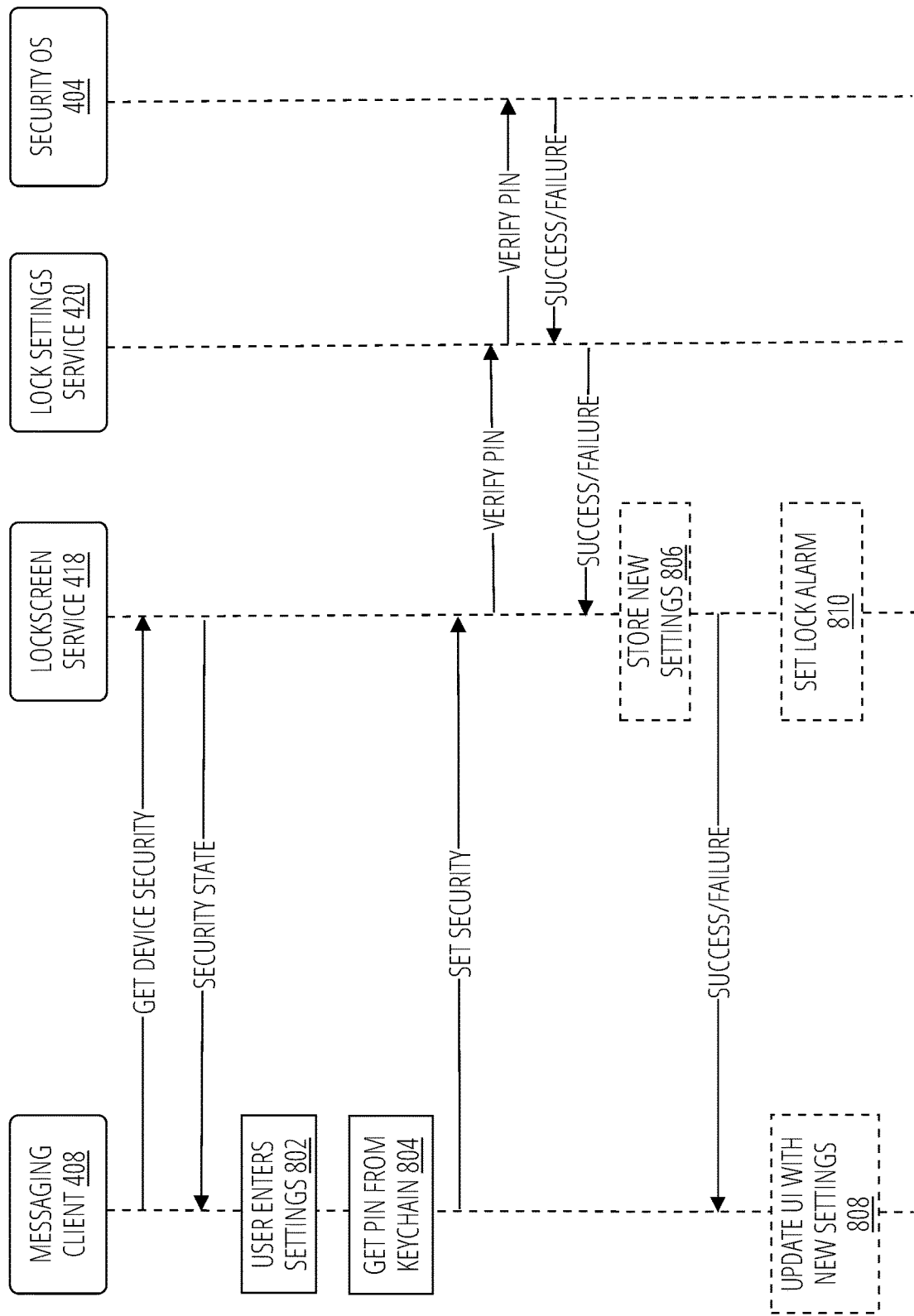

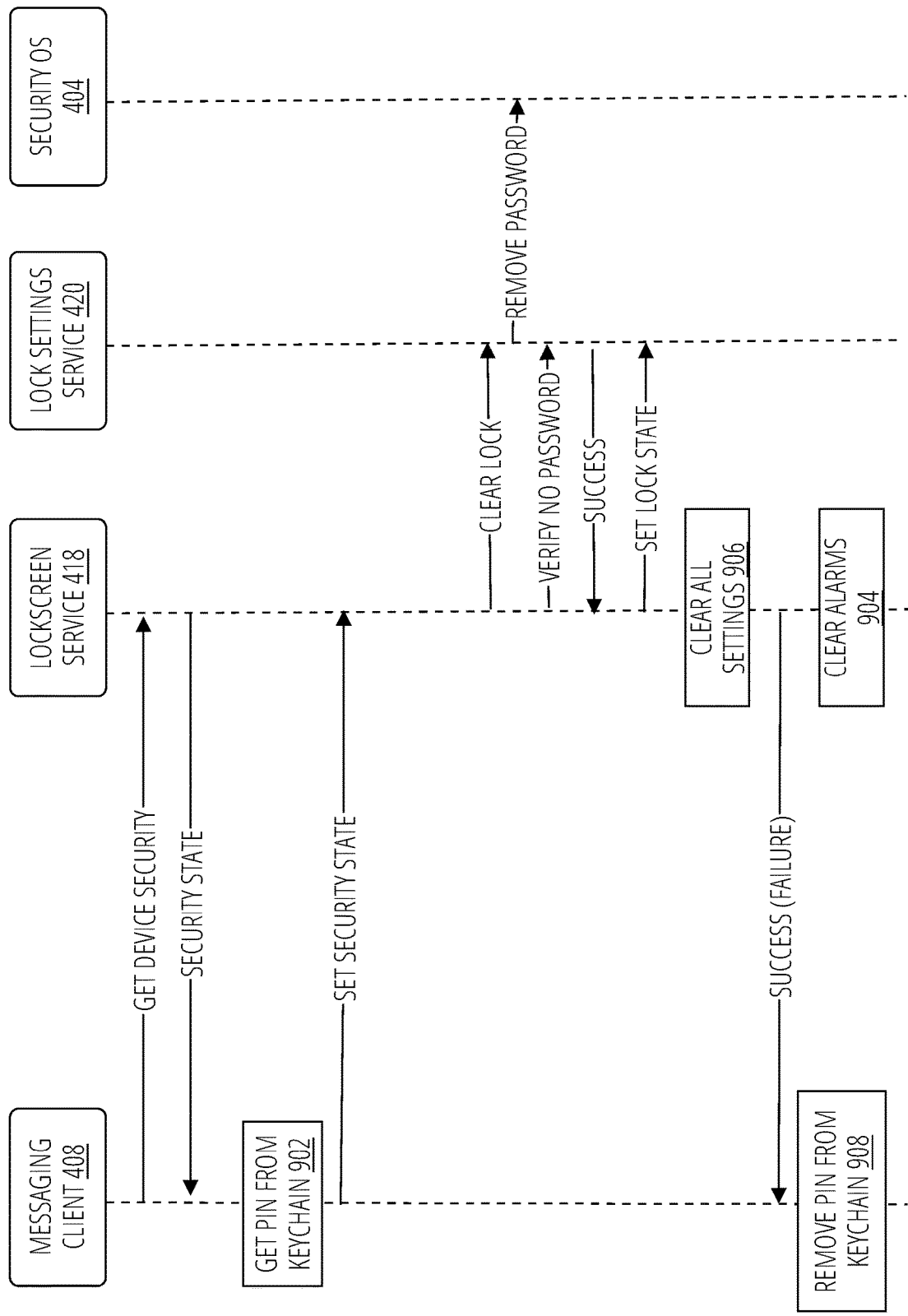

LOCKSCREEN FOR HEAD-WORN AUGMENTED REALITY DEVICE

TECHNICAL FIELD

The present disclosure generally relates to head-worn devices with displays for augmented or virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

A user of the head-worn device may access a messaging or social network application to view or share content with other users of the application. In some cases, live or stored content can be viewed and enhanced or modified by the user. That is, images, video or other media for enhancement can be captured from a live camera or can be retrieved from local or remote data storage.

In many instances, a head-worn device may be associated with a mobile device running a related application. The mobile device typically includes a lock-screen for security, which is activated when it enters an inactive or less-active state, for example based on the expiry of a timer or on the user pressing a button to shut off the display of the mobile device. Current lock-screens as implemented on mobile devices can provide challenges when paired with a device such as a head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates a sequence diagram for changing the settings on secure glasses according to some examples.

FIG. 9 illustrate a sequence diagram for clearing a PIN on secure glasses according to some examples.

DETAILED DESCRIPTION

Figure 1:
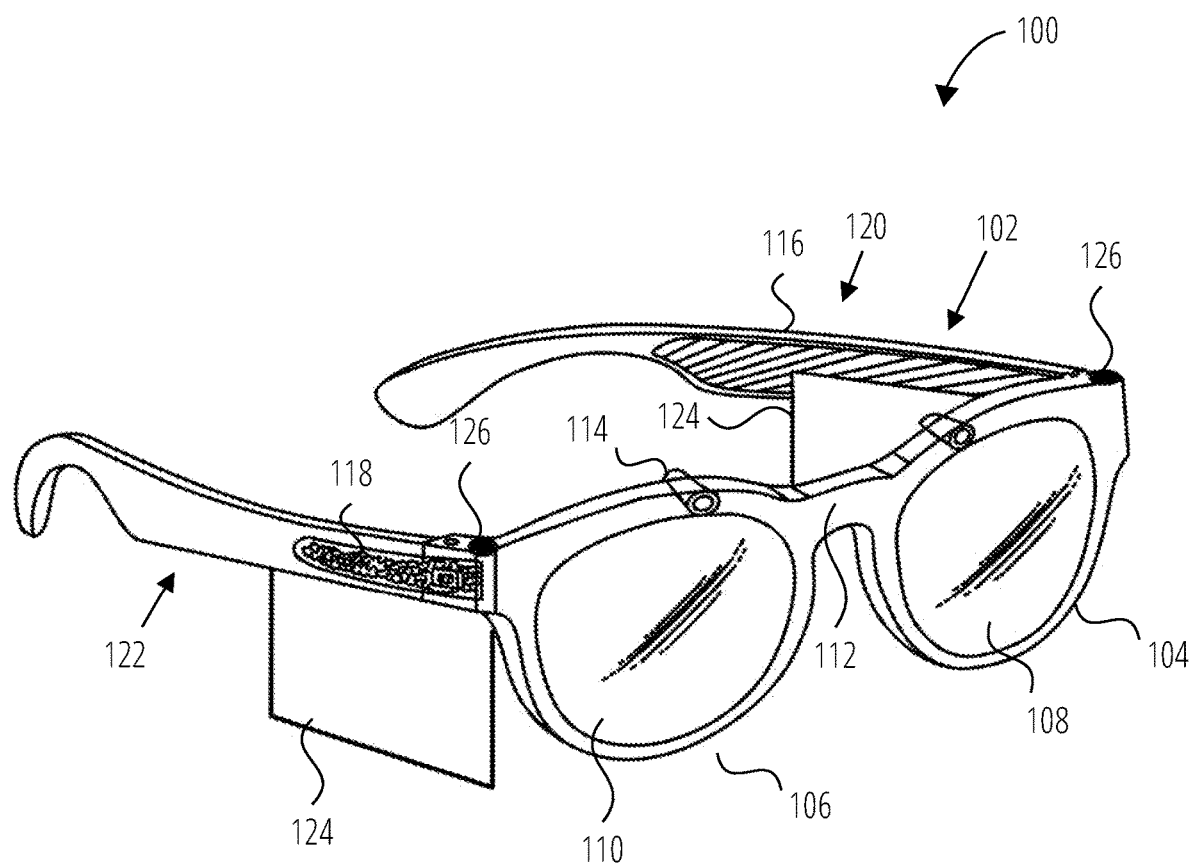
FIG. 1 is a perspective view of a head-worn device comprising glasses, in accordance with some examples.

Known head-worn devices, such as AR spectacles, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used.

Navigation of the information or a user interface of the head-worn device may in some cases be provided by voice commands or by input to an associated mobile device such as a smartphone. In some examples, a touchpad is provided on the head-worn device, which may be used to provide x-y touch and tap input to the head-worn device. Sophisticated head-worn devices can now perform or initiate tasks previously associated with smartphones, such as browsing, viewing and capturing media, selecting recipients for captured media, and forwarding captured media to the selected recipients. Providing an appropriate and coordinated lock-screen functionality with an associated smartphone can be challenging.

Head-worn devices are also resource-constrained devices, for example as regards memory, storage, and battery power, and are also latency sensitive to ensure a satisfactory user experience. Head-worn devices need to operate in various environments in an efficient manner as regards resource consumption and battery use. Memory usage can also fluctuate, for example when a user is capturing or forwarding media. A critical operation is system boot for the head-worn device and associated mobile device, which can be associated with increased resource consumption and system pressure caused by the operating systems starting multiple services at the same time. This can lead to multiple undesirable side-effects such as a system going out of memory or ending in a non-responsive state.

Due to limitations in user interactions with the head-worn device, a significant portion of the user interface is executed on the paired mobile device. Additionally, there are multiple processes and processors operating in both the head-worn device and the paired mobile device. The security state needs to be synchronized across paired devices and processors. The head-worn device's main processor also shuts down frequently, providing further challenges to boot time, security and encryption.

To address these technical problems, in some examples the security settings are modifiable on the mobile device while the enforcement of the security settings occurs on the head-worn device. A security software architecture allows changes to the security settings on the mobile device and keeps them synchronized across multiple processors. Restarting of the main processor of the head-worn device after a period of inactivity is simplified by separating data into user sensitive and non-sensitive data. All functionality that does not require user sensitive data is available with reduced delay by allowing relevant services to operate in this limited functionality mode. The head-worn device then transitions gracefully to fully operational mode after the combination of the head-worn device and mobile device have been unlocked by the user.

In some examples, provided is a method executed by one or more processors in a head-worn device including one or more display devices, the method comprising receiving an activation input, performing a partial bootup of the head-worn device, receiving an instruction to perform a function, determining whether the instruction is permitted for partial bootup execution, based on the instruction being permitted for partial bootup execution, executing the instruction, and based on the instruction not being permitted for partial bootup execution, completing a bootup of the head-worn device. The method may further comprise determining whether the instruction requires user authentication in order to be executed, and based on the instruction being partial bootup compatible and not requiring user authentication, executing the instruction. The partial bootup of the head-worn device may include starting a lockscreen service and a camera service.

Still further, the method may comprise determining whether the instruction requires user authentication in order to be executed, and based on the instruction requiring user authentication, executing a user authentication procedure regardless of whether or not the instruction is partial bootup compatible. The method may also comprise verifying correct user authentication, completing a bootup of the head-worn device, and executing the instruction.

Verifying correct user authentication may comprise receiving a password from a related mobile device. Base on correct user authorization not being verified using the password received from the related mobile device, the method may further comprise prompting user input of a password via the head-worn device. Further, an authenticated state of the head-worn device may be maintained based on proximity of the head-worn device to the related mobile device.

In some examples, provided is a head-worn device including one or more cameras, one or more display devices and one or more processors. The head-worn device also includes a memory storing instructions that, when executed by the one or more processors, configure the device to perform operations according to any of the methods and limitations described above, including but not limited to receiving an activation input, performing a partial bootup of the head-worn device, receiving an instruction to perform a function, determining whether the instruction is permitted for partial bootup execution, based on the instruction being permitted for partial bootup execution, executing the instruction, and based on the instruction not being permitted for partial bootup execution, completing a bootup of the head-worn device.

In some examples, provided is a non-transitory computer-readable storage medium, the computer-readable storage medium including instructions that when executed by a head-worn device including one or more display devices and one or more cameras, cause the head-worn device to perform operations according to any of the methods and limitations described above, including but not limited to performing a partial bootup of the head-worn device, receiving an instruction to perform a function, determining whether the instruction is permitted for partial bootup execution, based on the instruction being permitted for partial bootup execution, executing the instruction, and based on the instruction not being permitted for partial bootup execution, completing a bootup of the head-worn device.

Other technical features may be readily apparent to one skilled in the art from the following figures, descriptions, and claims.

FIG. 1 is perspective view of a head-worn device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples, the entire frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple piece 120 and the temple piece 122. The computer 118 can include one or more processors with memory, wireless communication circuitry, and a power source. As discussed below, the computer 118 comprises low-power circuitry, high-speed circuitry, and a display processor. Various some examples may include these elements in different configurations or integrated together in different ways. Additional details of aspects of computer 118 may be implemented as illustrated by the data processor 302 discussed below.

The computer 118 additionally includes a battery 116 or other suitable portable power supply. In some examples, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, some examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include a touchpad 124 mounted to or integrated with one or both of the left temple piece 120 and right temple piece 122. The touchpad 124 is generally vertically-arranged, approximately parallel to a user's temple in some examples. As used herein, generally vertically aligned means that the touchpad is at least more vertical than horizontal, although preferably more vertical than that. Additional user input may be provided by one or more buttons 126, which in the illustrated embodiment are provided on the outer upper edges of the left optical element holder 104 and right optical element holder 106. The one or more touchpads 124 and buttons 126 provide a means whereby the glasses 100 can receive input from a user of the glasses 100.

Figure 2:
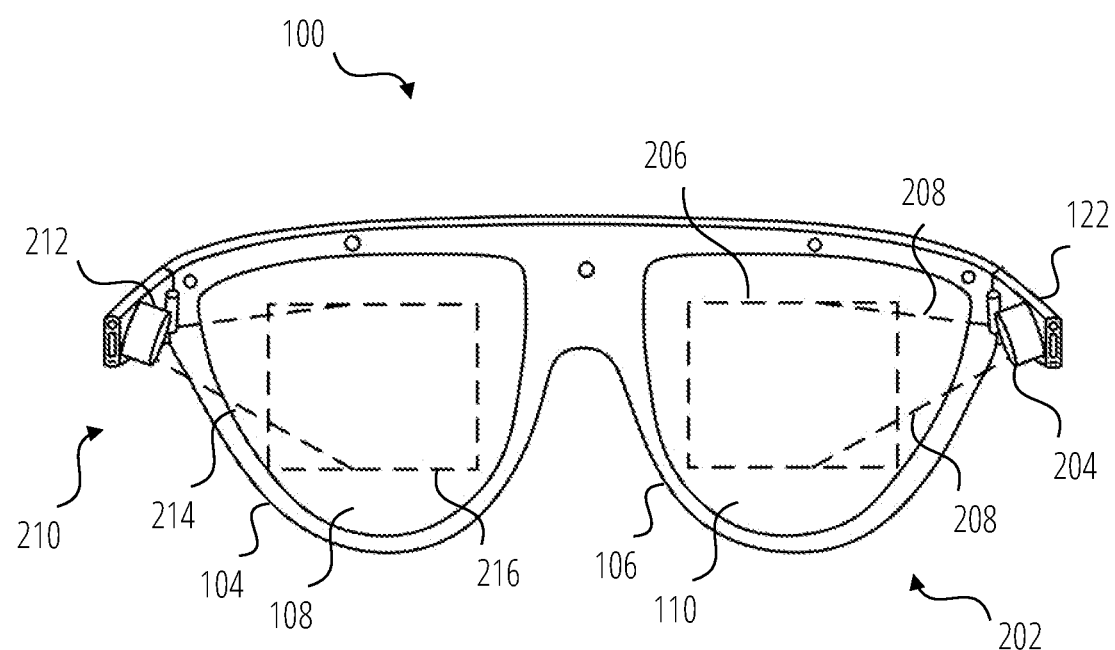
FIG. 2 illustrates a further view of the head-worn device of FIG. 1, in accordance with some examples.

FIG. 2 illustrates the glasses 100 from the perspective of a wearer. For clarity, a number of the elements shown in FIG. 1 have been omitted. As described in FIG. 1, the glasses 100 shown in FIG. 2 include left optical element 108 and right optical element 110 secured within each of the left optical element holder 104 and the right optical element holder 106 respectively.

The glasses 100 include forward optical assembly 202 comprising a right projector 204 and a right near eye display 206, and a forward optical assembly 210 comprising a left projector 212 and a near eye display 216.

In one embodiment, the near eye displays are waveguides. The waveguides includes reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user.

It will be appreciated however that other display technologies or configurations may be provided that can display an image to a user in a forward field of view. For example instead of a projector 204 and a waveguide, an LCD, LED or other display panel or surface may be provided instead.

In use, a wearer of the glasses 100 will be presented with information, content and various user interfaces on the near eye displays. As described in more detail below, the user can then interact with the glasses 100 using a touchpad 124 and/or the buttons 126, in addition to providing voice inputs or touch inputs on an associated device, for example client device 328 illustrated in FIG. 3.

Figure 3:
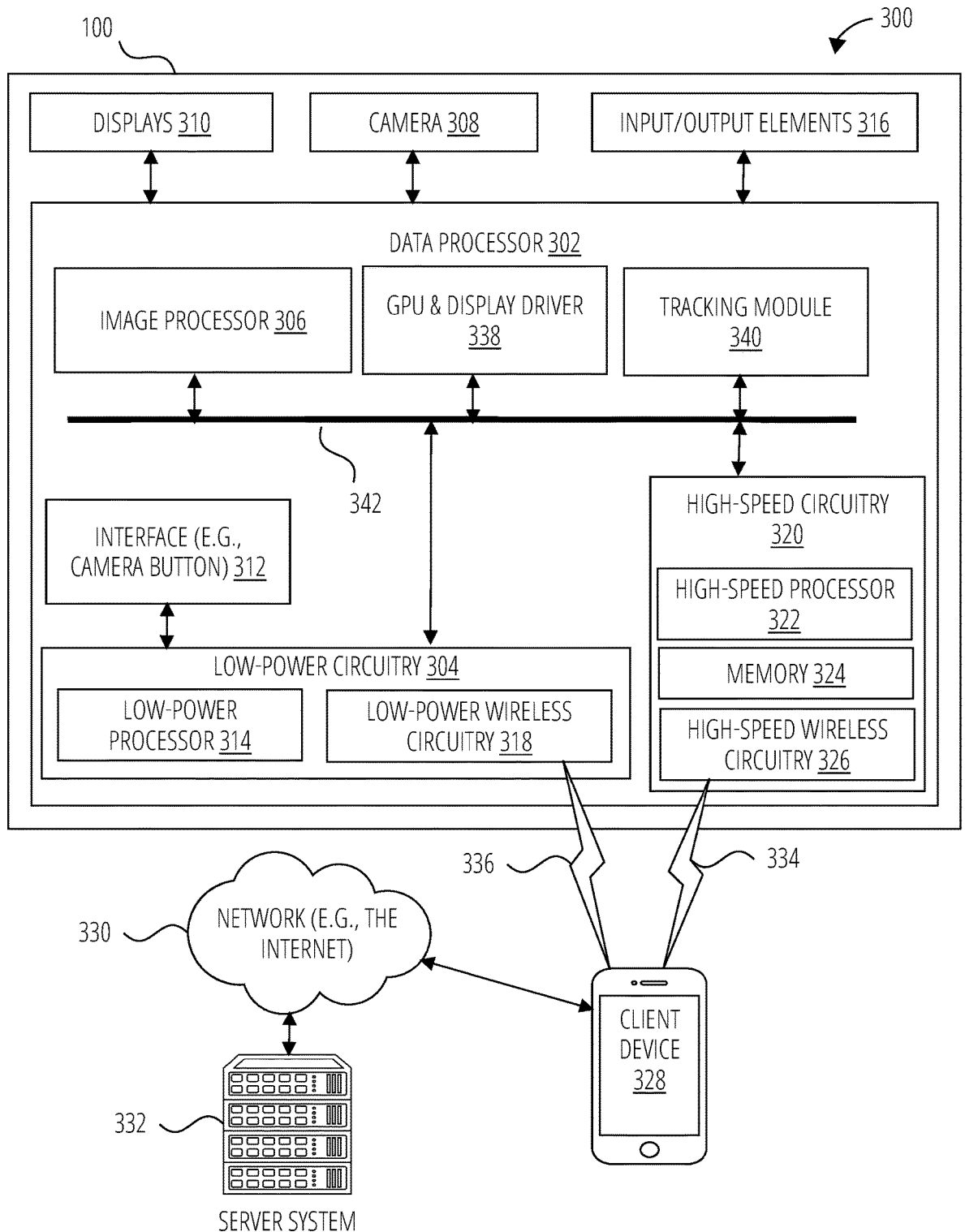
FIG. 3 is a block diagram illustrating a networked system including details of the head-worn device of FIG. 1, in accordance with some examples.

FIG. 3 is a block diagram illustrating a networked system 300 including details of the glasses 100, in accordance with some examples.

The networked system 300 includes the glasses 100, a client device 328, and a server system 332. The client device 328 may be a smartphone, tablet, phablet, laptop computer, access point, or any other such device capable of connecting with the glasses 100 using both a low-power wireless connection 336 and a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1604 or the machine 1700 described in FIG. 16 and FIG. 17.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 16 and FIG. 17. For example, the input/output elements 316 may include any of I/O components 1706 including output components 1728, motion components 1736, and so forth. Examples of the displays 310 are discussed in FIG. 2. In the particular examples described herein, the displays 310 include a display for each one of a user's left and right eyes.

The data processor 302 includes an image processor 306 (e.g., a video processor), a GPU and display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the camera 308. In some examples, the interface 312 may have a software component, or may be associated with a command received wirelessly from another source, such as from the client device 328.

The image processor 306 includes circuitry to receive signals from the camera 308 and process those signals from the camera 308 into a format suitable for storage in the memory 324 or for transmission to the client device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In some examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 1612 of FIG. 16. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In some examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in some examples, the memory 324 may be an independent stand-alone element of the data processor 302. In certain such examples, electrical routing lines may provide a connection through a chip that includes the high-speed processor 322 from image processor 306 or the low-power processor 314 to the memory 324. In some examples, the high-speed processor 322 may manage addressing of the memory 324 such that the low-power processor 314 will boot the high-speed processor 322 any time that a read or write operation involving the memory 324 is needed.

The tracking module 340 estimates a pose of the glasses 100. For example, the tracking module 340 uses image data and corresponding inertial data from the camera 308 and the position components 1740, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU and display driver 338 may use the pose of the glasses 100 to generate frames of virtual content or other content to be presented on the displays 310 when the glasses 100 are functioning in a traditional augmented reality mode. In this mode, the GPU and display driver 338 generates updated frames of virtual content based on updated three-dimensional poses of the glasses 100, which reflect changes in the position and orientation of the user in relation to physical objects in the user's real-world environment.

The virtual content presented on the displays 310 may provide a virtual reality experience that includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets used to apply a selected augmented reality experience to an image or a video feed. In some examples, augmented reality effects are provided by Snap, Inc. under the registered trademark LENSES.

One or more functions or operations described herein may also be performed in an application resident on the glasses 100 or on the client device 328, or on a remote server. For example, one or more functions or operations described herein may be performed by one of the applications 1606 such as messaging application 1646.

Figure 4:
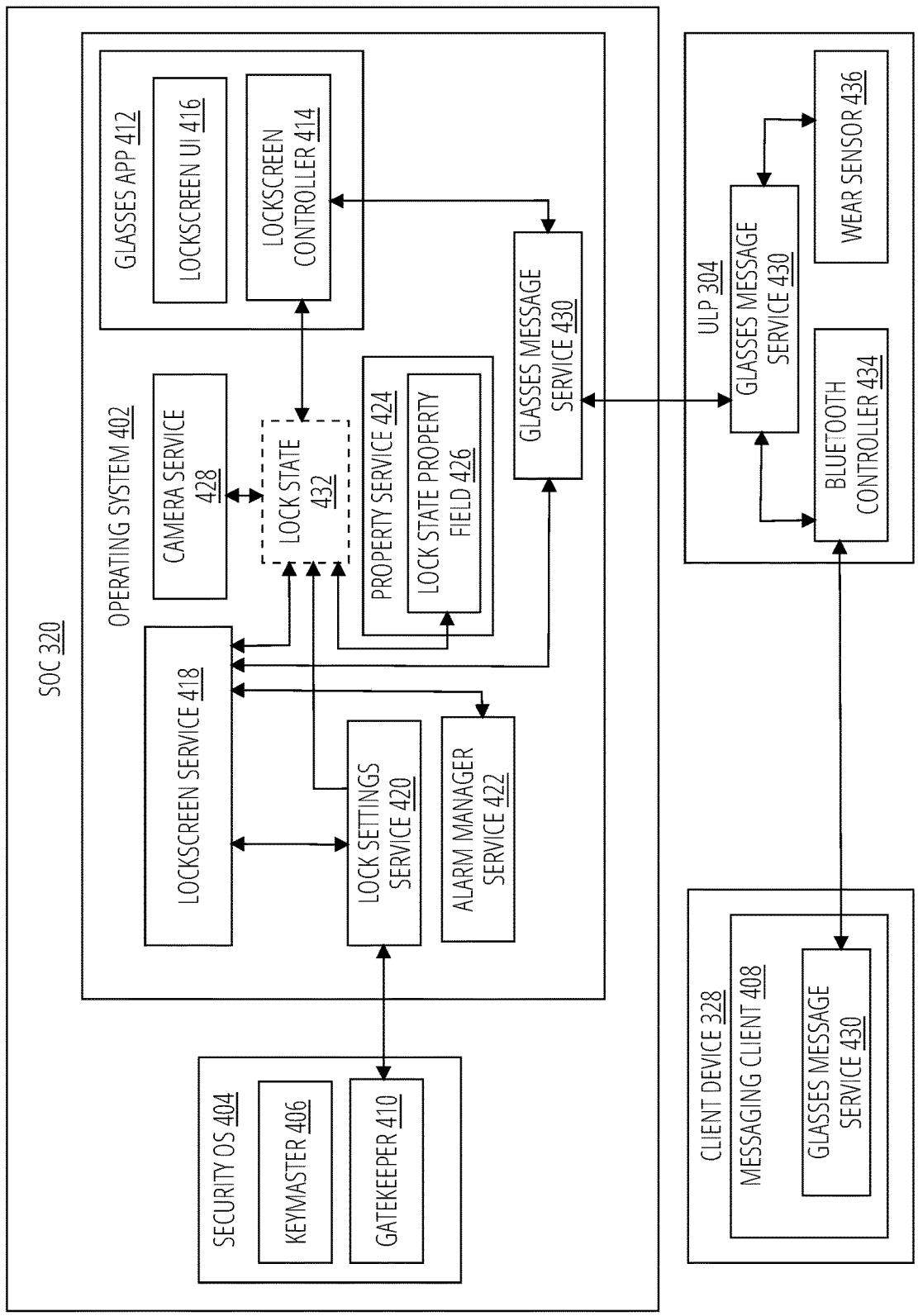
FIG. 4 is a block diagram illustrating the architecture of the glasses in more detail, according to some examples.

FIG. 4 is a block diagram illustrating the architecture of the glasses 100 in more detail, according to some examples. As discussed above with reference to FIG. 3, the glasses include high-speed circuitry 320 and low-power circuitry 304. The high-speed circuitry 320 and the low-power circuitry 304 may for example each be implemented as a System-On-a-Chip (SOC).

The high-speed circuitry 320 runs an operating system 402 and a security OS 404. The security OS 404 provides a trusted execution environment, which is a secure area of the high-speed circuitry 320 that ensures sensitive data is stored, processed and protected in an isolated and trusted environment. As such, it performs user authentication functions and offers protection against software attacks generated in or originating from the operating system 402.

The security OS 404 runs keymaster 406 and gatekeeper 410 security-related functions. The keymaster 406 stores security certificates and hashed passwords, as well as generating the keys and certificates used to encrypt the file system used in the memory 324 of the high-speed circuitry 320. The gatekeeper 410 handles security requests from the operating system 402 and delegates relevant operations to the keymaster 406 during password setting, changing and verification operations. The password may in some examples be a personal identification number (PIN), although other user authentication methods may be used, such as for example biometric techniques.

The gatekeeper 410 also enforces user lockouts when there are too many failed login attempts. The number of attempts and lockout times are measured using a monotonic clock to avoid defeating lockout enforcement by changing the time or draining the battery of the glasses 100. When a password is set for the first time on the glasses after factory reset, the gatekeeper 410 encrypts the user file system with a key and associates it with the user ID. When the glasses 100 boot up, the user must unlock the glasses 100 at least once to allow the operating system 402 to decrypt and mount the file system. Subsequent locking of the glasses 100 does not encrypt the file system again until a reboot.

Until the user has entered their password and the file system is decrypted and mounted after booting up, the glasses 100 are said to be in direct boot mode. In direct boot mode, only certain direct-boot-aware applications are capable of execution and are permitted to execute, and access to encrypted data storage is not provided. Direct boot mode is thus a partial bootup or a partial boot mode, both in terms of the applications that are permitted to execute and in terms of the memory that is accessible by the direct-boot-aware applications. Direct boot mode is indicated, and the execution of direct-boot-aware applications is triggered, by a LOCKED_BOOT_COMPLETED system status and system status message. Once the user unlocks the glasses 100 using their password, the architecture completes the rest of the initialization and then updates the system status to, and sends out a BOOT_COMPLETED status message to launch several other applications, including a home/launcher application that is part of a glasses application 412.

The operating system 402 includes a framework having several helper classes and wrappers to communicate with the security OS 404 and to cache associated values. In some examples the operating system 402 and associated framework are based on the Android Open Source Project (AOSP). The operating system 402 includes a lockscreen service 418, a lock settings service 420, an alarm manager service 422, a property service 424 and a camera service 428.

The lockscreen service 418 is a direct boot aware application and first to launch in order to initialize the lock state 432 of the glasses 100 before any other service or application reads the lock state 432. The lockscreen service 418 is also a persistent application, in that the operating system 402 automatically restarts the application whenever the lockscreen service 418 terminates. The lockscreen service 418 also maintains all user settings for security, such as the amount of time after the glasses are removed from the user's face (or "doffed") that the glasses 100 are locked. For extra security, all the setting values are stored by the lockscreen service 418 as encrypted strings in key-value pairs.

The lockscreen service 418 also handles all password-related communication with the lock settings service 420 via operating system 402 APIs, including handling the setting, changing and removal of a password from the device, verifying entered passwords and reporting successful and failed verify attempts, as well as reporting any user lockout states and times to other services. The lockscreen service 418 also handles setting the correct lock alarms using the alarm manager service 422 in the Android Framework. When an alarm goes off, the lockscreen service 418 is notified by the alarm manager service 422 and locks the glasses by setting the lock state property field 426 property in the property service 424 to True. The lockscreen service 418 also clears any alarms when the settings or the state change, such as if the user puts the glasses back on (or "dons" the glasses 100) before the doffed alarm timer expires, and sets new alarms set as needed.

The lockscreen service 418 also monitors the status of a wear sensor 436 state and notifies related services when the user dons or doffs the glasses 100. The lockscreen service 418 queries the low-power circuitry 304 for the state of the wear sensor 436 via a proprietary glasses message service 430.

The alarm manager service 422 is a standard operating system 402 service that allows applications or services to set an alarm that provides them with a message at a specified later time. The alarm manager service 422 is commonly used to initiate periodic or delayed tasks otherwise having an inexact timer. This permits accurate coordination with other tasks or services for efficiency. The lockscreen service 418 requires exact alarms based on uptime to avoid problems that may otherwise result from changed date and time settings, such as the particular time of day, date or time zone.

All password and security-related communications between the security OS 404 and any other services or applications on the high-speed circuitry 320 are routed through the lock settings service 420. The lock settings service 420 provides a wrapper for communication with the gatekeeper 410, and communicates with the gatekeeper 410 using an inter-process communication protocol that is specific to the security OS 404.

The property service 424 is also a is a direct boot aware application. The property service 424 stores the current lock state 432 in a lock state property field 426 as a true or false (binary) value.

The glasses application 412 is a proprietary application that provides the user experience for the glasses 100. It is the main foreground activity that is executed by the glasses 100 and it initializes and maintains an instance of an AR module (not shown) that manages and displays a user interface and any selected AR content or effects provided by the glasses 100. As illustrated in FIG. 4, the glasses application 412 also includes a lockscreen UI 416 and a lockscreen controller 414. Since the lockscreen UI 416 and the lockscreen controller 414 display the lockscreen to the user, these are also direct boot aware services that start in direct boot mode and are initialized before the rest of the glasses application 412.

The lockscreen UI 416 displays the lockscreen to the user on the displays 310 of the glasses 100 and receives user input of a PIN to unlock the glasses 100. The lockscreen UI 416 also displays other security-related information such as a lockout timer, animations or dialog boxes to indicate failed attempts and number of failed attempts, and so forth.

The lockscreen controller 414 monitors the lock state 432 as maintained by the property service 424. The lockscreen controller 414 blocks user and system access to any other glasses 100 functionality when the glasses are locked with the lock state 432 having a True value. The lock state 432 of the glasses 100 is communicated to the user via the lockscreen UI 416 as needed. The lockscreen controller 414 also communicates with the lockscreen service 418, via the glasses message service 430, to pass the PIN entered by the user to the lockscreen service 418. The lockscreen controller 414 also initiates the main UI for the glasses 100 based on the lock state 432 changing from True to False when an unlock attempt succeeds or the device is unlocked via other means, such as a system reset or the expiry of an alarm.

The proprietary glasses message service 430 is a request-response protocol that handles remote procedure calls (RPC) between the messaging client 408 on the client device 328, the Bluetooth controller 434 in the low-power circuitry 304, and the lockscreen controller 414 in the glasses application 412. All of the software modules that are proprietary to the maker of the glasses 100 and the provider of the messaging client 408 communicate with each other using the glasses message service 430. The glasses message service 430 also acts as a controller, transferring messages between the wear sensor 436 and lockscreen service 418.

In some examples, the following remote procedure calls are supported by the glasses message service 430.

SetUserDeviceSecurityRequest: This RPC is sent by the messaging client 408 to set a password on unsecure glasses 100 that do not have an existing password, to remove a password and all security settings (including user settings) on glasses 100 that have an existing password, thereby to thereby disable security, or to change settings such as delay before unlock, events that trigger locking, and so forth.

GetUserDeviceSecurityRequest: This RPC returns all the user settings for the glasses 100 as well as the lock state 432 state (e.g., device locked out, timeout, etc.). This RPC is used by both the messaging client 408 and the lockscreen controller 414, to query the current lock state 432 state during initiation or refresh operations.

SetUserDevicePasswordRequest: This RPC is used by the messaging client 408 to change the password for the glasses 100.

IsDeviceSecure: This RPC is used on initial bootup to determine if a password has been set for the glasses 100.

VerifyPasscodeRequest: This RPC is used to verify the password and, if the password is verified then the specified request is authorized. The following requests are supported: a) User Unlock: the password is verified and if successful, the glasses 100 is unlocked, b) Proximity Unlock: the password is verified and if successful, the device is unlocked or kept unlocked while the client device 328 and messaging client 408 are connected to the glasses 100 via a Bluetooth or other short-range link, c) Verify: Only used to verify the password, which can be used by the messaging client 408 to verify the current PIN during pairing with the glasses 100 or when changing the password.

PairingRequest: This RPC is used by the low-power circuitry 304 firmware to verify that the glasses are safe to pair via Bluetooth. This is allowed only when the operating system 402 is booted fully and the lock state 432 is False, that is the glasses 100 are unlocked.

The low-power circuitry 304 includes a Bluetooth controller 434 that handles Bluetooth communication with the messaging client 408.

Figure 5A:
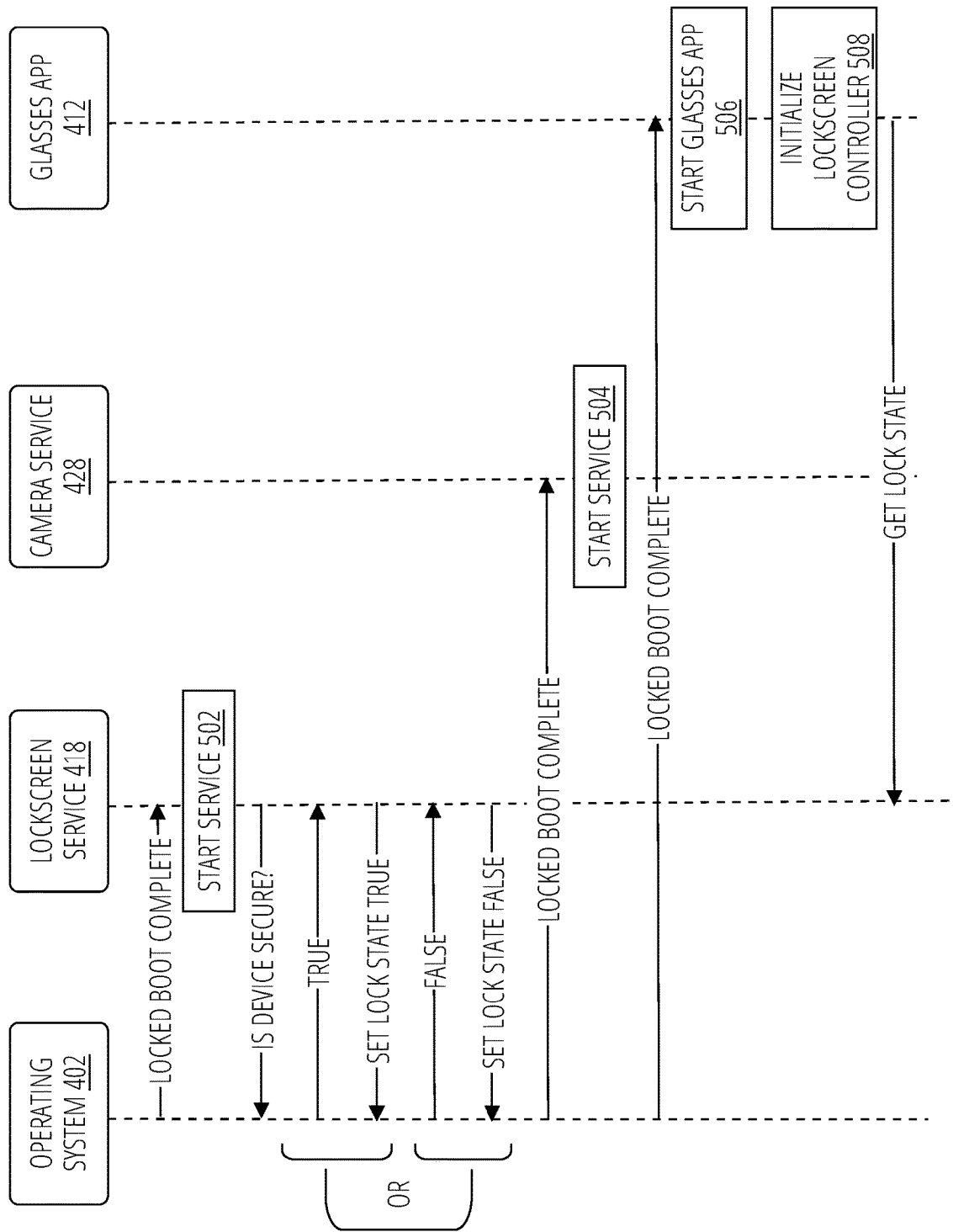
FIG. 5A and FIG. 5B illustrate a sequence diagram for lockscreen initialization at bootup of the glasses according to some examples.
Figure 5B:
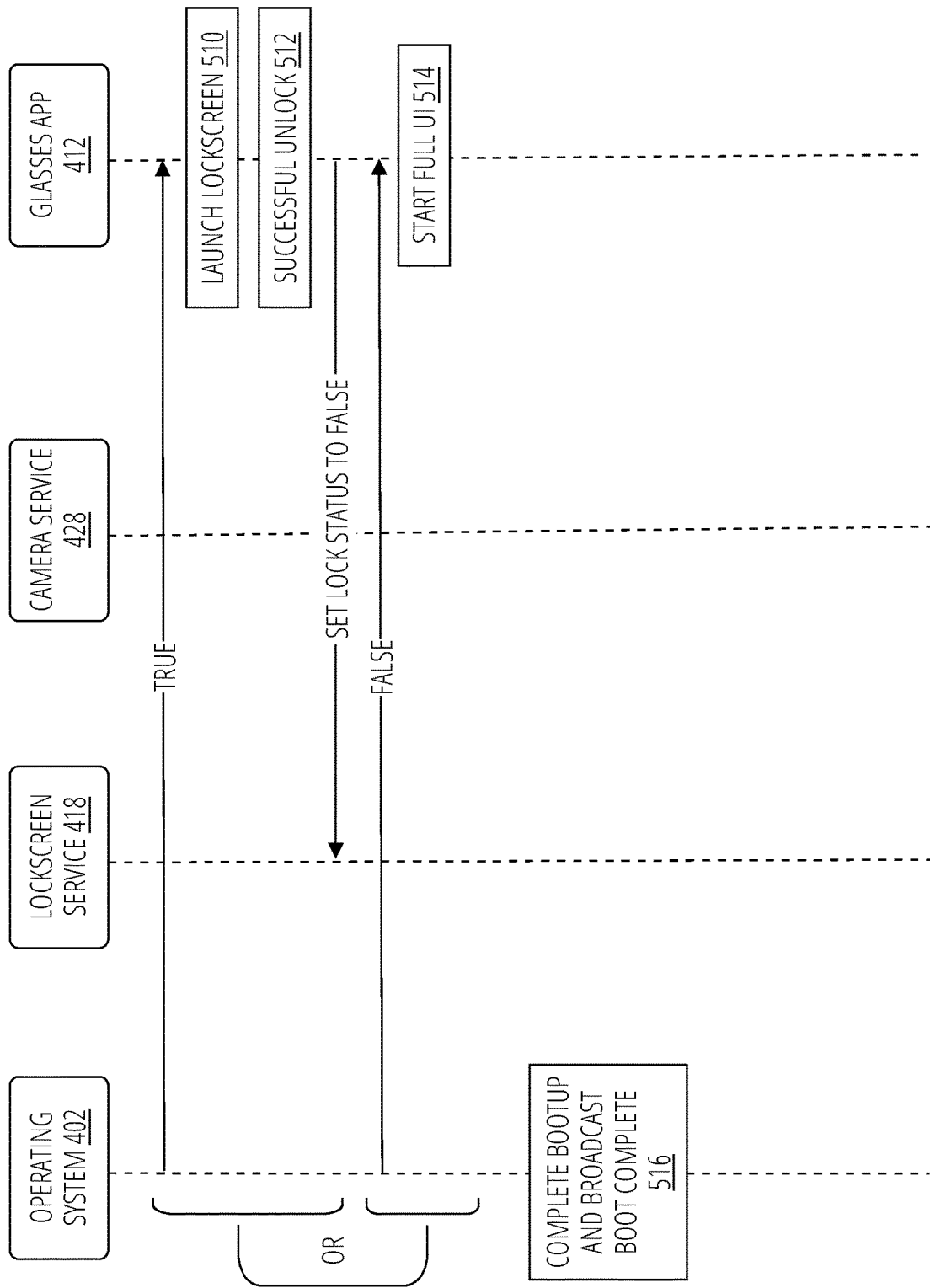

FIG. 5A and FIG. 5B illustrate a sequence diagram for lockscreen initialization at bootup of the glasses 100 according to some examples. The sequence diagram illustrates information flows and calls between components and associated state changes.

The sequence diagram commences when the operating system 402 completes the locked boot process and reports that the locked boot process is complete. This is broadcast as a system status message. In response to the locked boot complete status message, the lockscreen service 418 is started at operation 502. The lockscreen service 418 then queries the operating system 402 (via the lock settings service 420) as to whether the glasses 100 are secure. The glasses 100 are considered to be a secure device if a password has already been set. If the lock settings service 420 responds with True then the lockscreen service 418 sets the lock status to True (via the lock settings service 420) to lock the glasses 100. If the lock settings service 420 responds with False then the lockscreen service 418 sets the lock status to False to unlock the glasses 100.

In response to the locked boot complete status message, the camera service 428 is started at operation 504. The camera service 428 is a boot-aware process. The glasses application 412 is also started at operation 506. The glasses application 412 then initializes the lockscreen controller 414 in operation 508.

The glasses application 412 then requests the lock state 432 from the lockscreen service 418. The sequence diagram continues in FIG. 5B, with the operating system 402 either replying True or False. If the operating system 402 reports to the glasses application 412 that the device is locked (True) then the lockscreen UI 416 is launched in operation 510.

Assuming a successful unlock in operation 512, the glasses application 412 starts the full user interface of the glasses 100 in operation 514. If the operating system 402 reports to the glasses application 412 that the device is unlocked (False) then the full user interface of the glasses 100 is started in operation 514.

The operating system 402 then completes the bootup process and broadcasts a Boot Complete system message in operation 516. At this point the glasses 100 are fully booted up and functional.

Figure 6A:
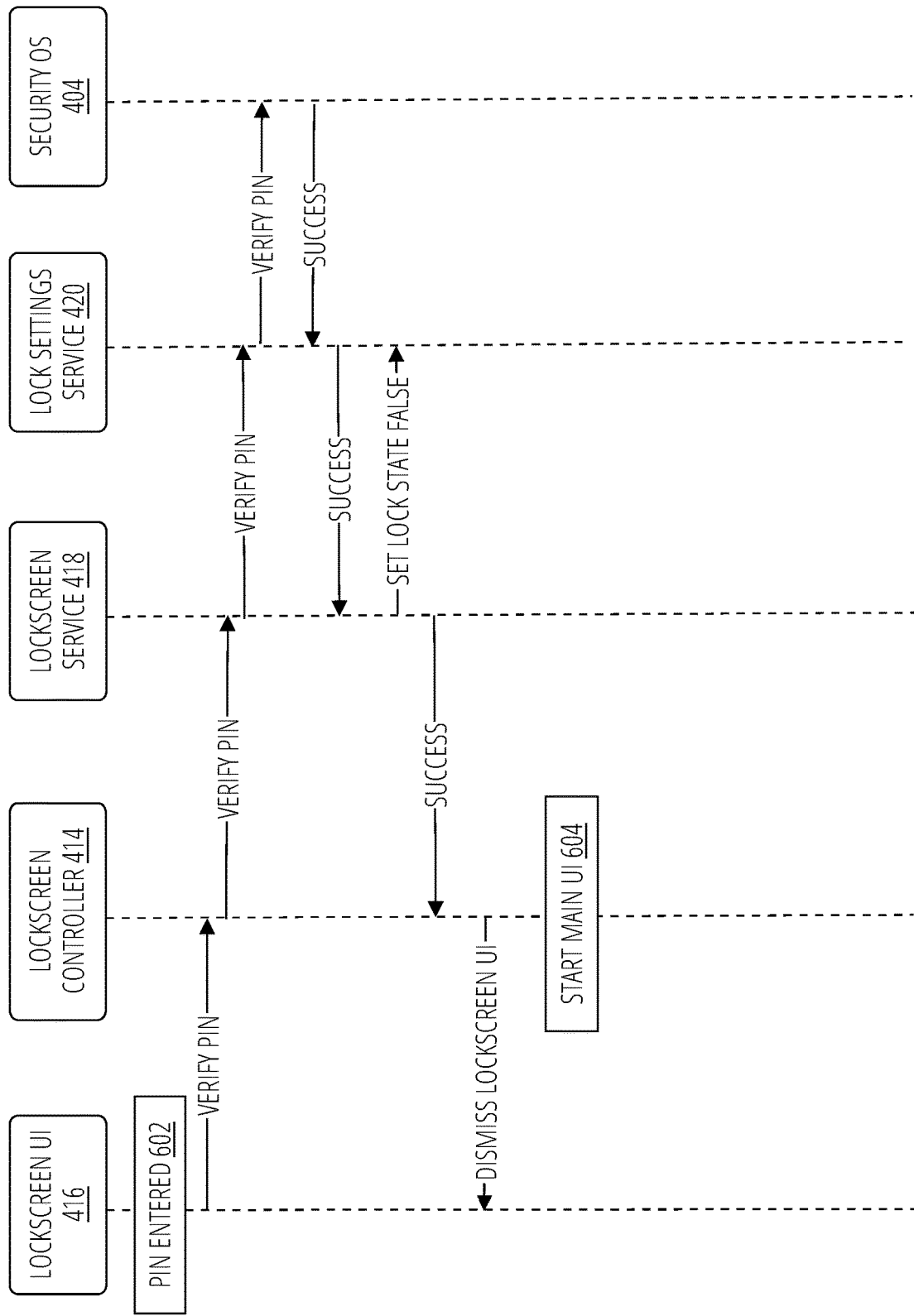
FIG. 6A and FIG. 6B illustrate sequence diagrams for user unlocking of the glasses according to some examples.
Figure 6B:
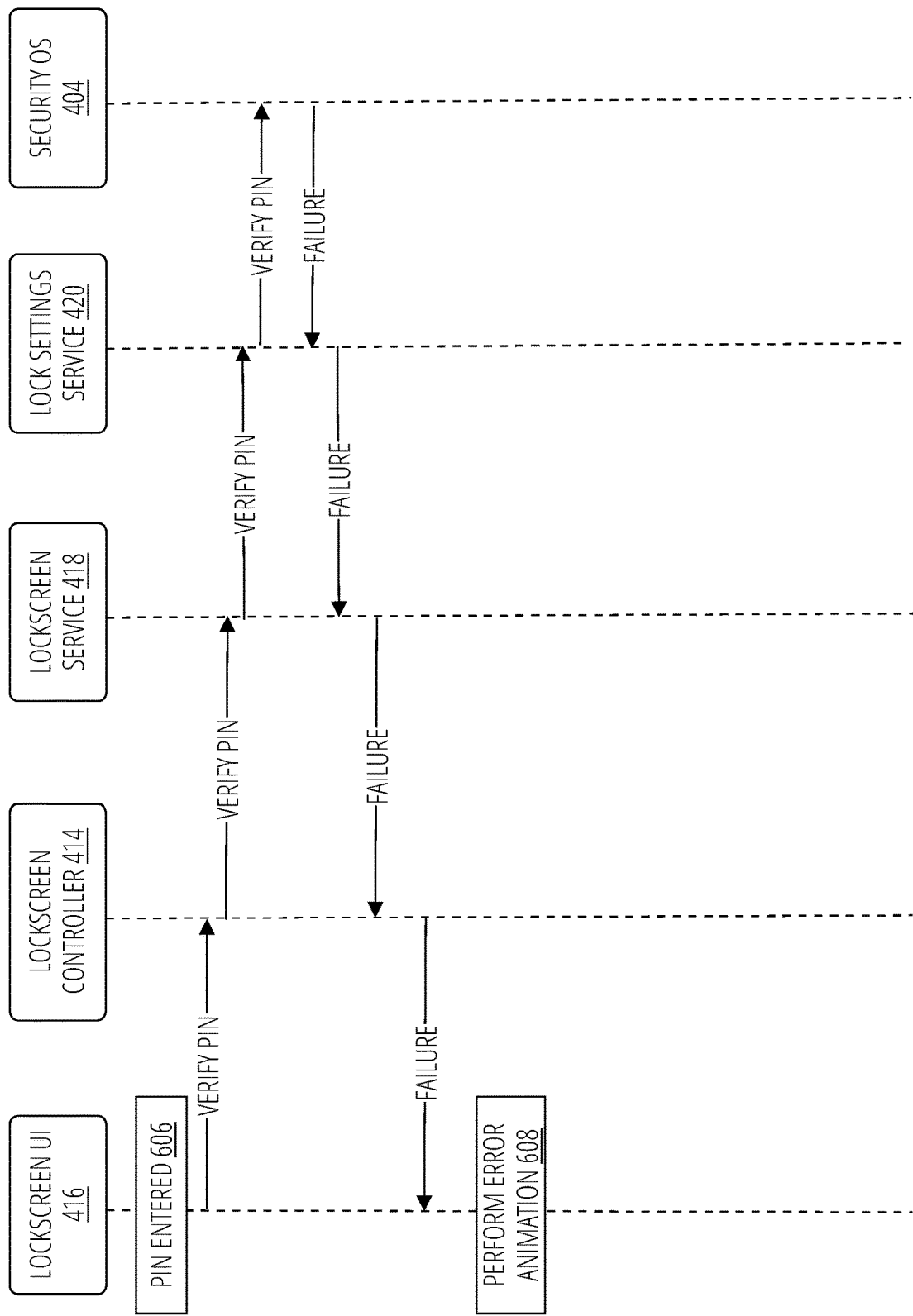

FIG. 6A and FIG. 6B illustrate sequence diagrams for user unlocking of the glasses 100 according to some examples. The sequence diagrams illustrate information flows and calls between components and associated state changes.

The sequence diagram illustrated in FIG. 6A commences with receipt of user input of the PIN by the lockscreen UI 416 in operation 602. The lockscreen UI 416 then sends the PIN to the lockscreen controller 414 with a Verify PIN request. The lockscreen controller 414 in turn sends the PIN to the lockscreen service 418 with a Verify PIN request. The lockscreen service 418 in turn sends the PIN to the lock settings service 420 with a Verify PIN request. The lock settings service 420 in turn sends the PIN to the lockscreen controller 414 with a Verify PIN request.

If the PIN is correct, the security OS 404 replies with a Success message to the lock settings service 420, which is passed by the lock settings service 420 to the lockscreen service 418. In response, the lockscreen service 418 instructs the lock settings service 420 to set the lock state to False, which indicates the glasses 100 are in an unlocked state. The lockscreen service 418 then passes the Success message to the lockscreen controller 414, which dismisses the lockscreen UI 416 and starts the main user interface of the glasses in operation 604.

The sequence diagram illustrated in FIG. 6B also commences with receipt of user input of the PIN by the lockscreen UI 416 in operation 606 and the passing of the PIN and the Verify PIN request along the line to the security OS 404 as for FIG. 6A. In this case however the PIN is incorrect and the security OS 404 responds to the lock settings service 420 with a Failure message. This message is passed down the line from the lock settings service 420 to the lockscreen service 418 to the lockscreen controller 414 to the lockscreen UI 416, where a PIN entry error animation is displayed by the glasses 100 to the user in operation 608.

Figure 7A:
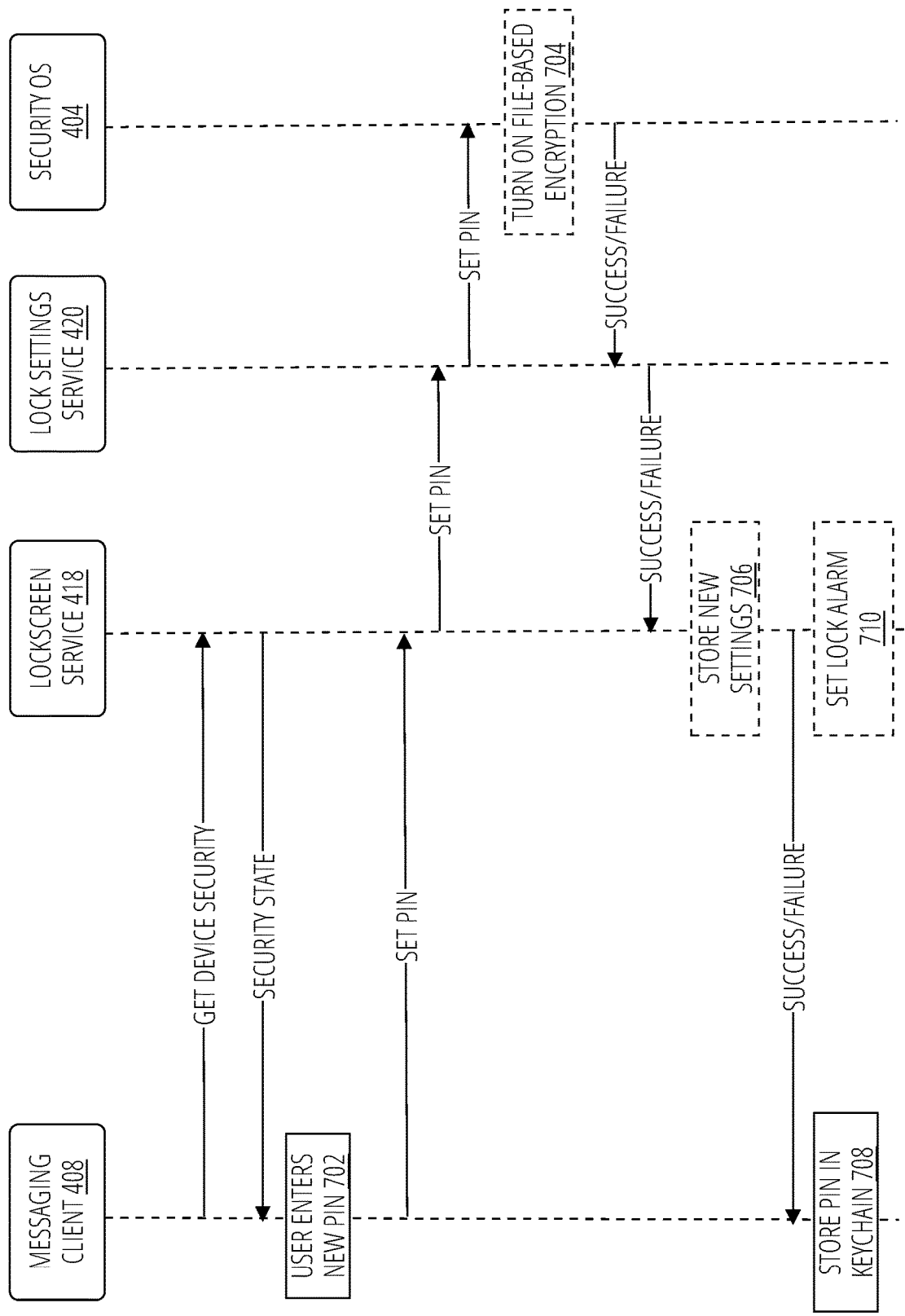
FIG. 7A and FIG. 7B illustrate a sequence diagram for setting a PIN on unsecure glasses according to some examples.
Figure 7B:
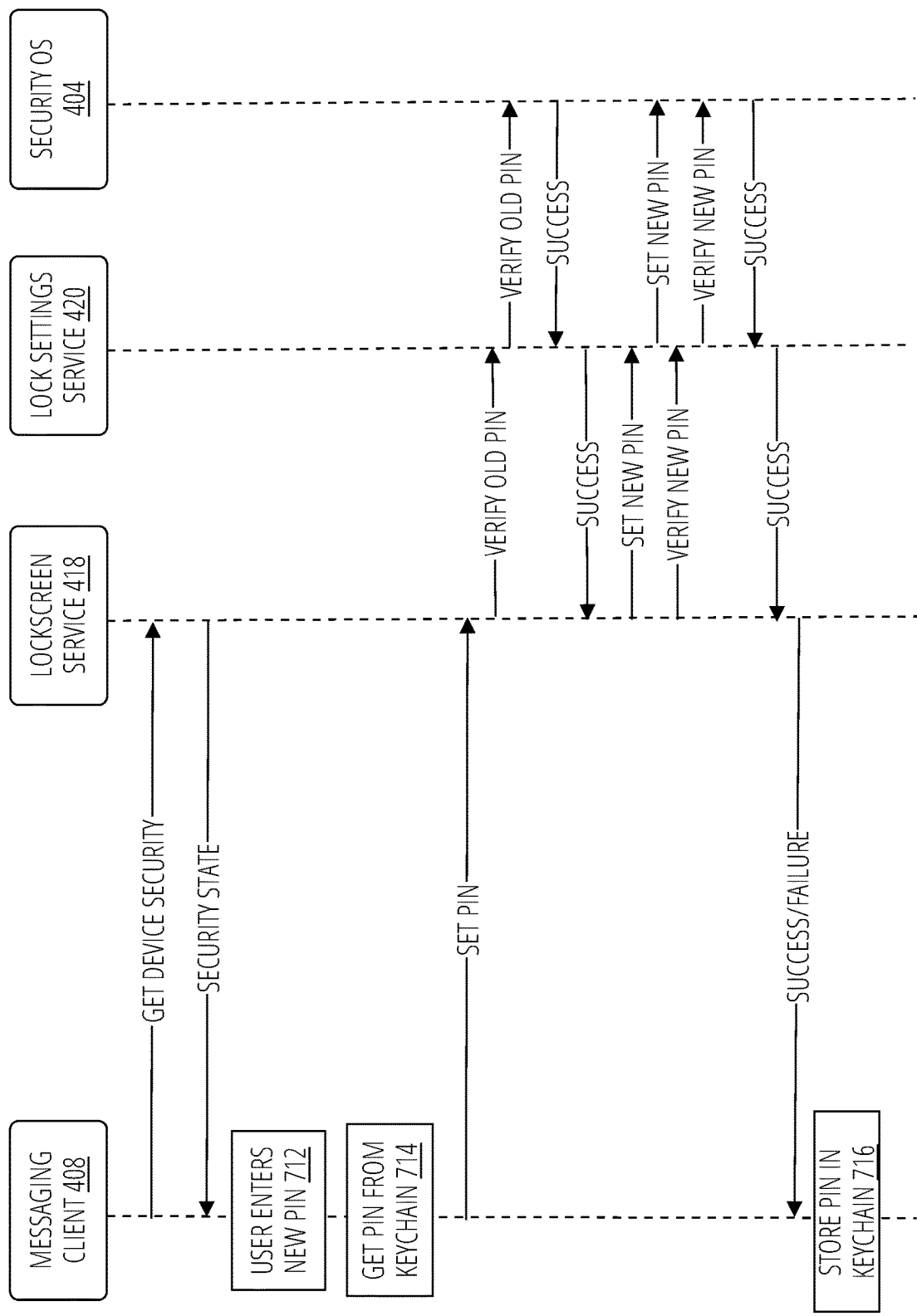

FIG. 7A and FIG. 7B illustrate a sequence diagram for setting a PIN on unsecure glasses 100 according to some examples. The sequence diagram illustrates information flows and calls between components and associated state changes. This sequence may occur on receipt by the user of new glasses 100 after pairing, in some examples.

FIG. 7A illustrates the sequence if a password has not been set. The sequence diagram commences with the messaging client 408 requesting the device security state from the lockscreen service 418. This is done via the glasses message service 430 on the client device 328, low-power circuitry 304 and operating system 402. In this particular case, the lockscreen service 418 replies to the messaging client 408 with an Unsecure security state. The messaging client 408 then prompts the user to enter a new PIN, which is entered at operation 702. The messaging client 408 then transmits a Set PIN message to the lockscreen service 418, which in turn passes it to the lock settings service 420, which in turn passes it to the security OS 404. If this is the first time that a PIN has been set, the security OS 404 turns on file-based encryption at operation 704 to further secure the device.

The security OS 404 then replies to the lock settings service 420 with a Success or Failure message, which is passed along the line to the messaging client 408. In the case of a Failure message, an appropriate failure dialog box or animation is presented by the messaging client 408 on the client device 328.

In the case of a Success message, the PIN is stored in the keychain of the messaging client 408 in operation 708. Additionally, if applicable, for example in the case this is a first setting of a PIN on the glasses 100, new settings are stored in the lockscreen service 418 in operation 706. The settings could for example be the amount of time after the glasses 100 are doffed or there is a loss of proximity between the glasses 100 and the client device 328 that the glasses are locked. Additionally, the lockscreen service 418 can set an alarm at the alarm manager service 422 in operation 710 if required or specified by the new settings.

FIG. 7A illustrates the sequence if a password has not been set. The sequence diagram commences with the messaging client 408 requesting the device security state from the lockscreen service 418. In this particular case, the lockscreen service 418 replies to the messaging client 408 with a Secure security state. The messaging client 408 then receives input of the new PIN from the user in operation 712 and retrieves the current PIN from the keychain in operation 714. The messaging client 408 then transmits a Set Security State message to the lockscreen service 418, which includes both the new PIN and the current PIN. The lockscreen service 418 then sends a Verify PIN message to the lock settings service 420 with the old PIN, which the lock settings service 420 sends to the security OS 404.

The security OS 404 checks the old PIN against the PIN stored in the keymaster 406 and returns sends a Success or Failure message to the lock settings service 420. A Failure message would be passed back along the line to the messaging client 408, and an appropriate failure dialog box or animation would be presented by the messaging client 408 on the client device 328.

A Success message from the security OS 404 to the lock settings service 420 in response to a request to verify the old PIN is passed by the lock settings service 420 to the lockscreen service 418. The lockscreen service 418 then sends a Set New PIN message to the lock settings service 420, which in turn sends a Set New Pin message to the security OS 404. The lockscreen service 418 then sends a Verify New PIN message to the lock settings service 420, which in turn sends a Verify New PIN message to the security OS 404. In response to verifying the new PIN, the security OS 404 sends a Success message to the lock settings service 420, which is passed back down the line to the messaging client 408. The messaging client 408, upon receiving the Success message, stores the new pin in the keychain in operation 716.

FIG. 8 illustrates a sequence diagram for changing the settings on secure glasses 100 according to some examples. The sequence diagram illustrates information flows and calls between components and associated state changes.

The sequence diagram commences with the messaging client 408 requesting the device security state from the lockscreen service 418. This is done via the glasses message service 430 on the client device 328, low-power circuitry 304 and operating system 402. In this particular case, the lockscreen service 418 replies to the messaging client 408 with a Secure security state. The messaging client 408 then prompts the user to enter new settings, which are received by the messaging client 408 at operation 802. The messaging client 408 then retrieves the current PIN from the keychain in operation 804 and transmits a Set Security message to the lockscreen service 418. The lockscreen service 418 then sends a Verify PIN message to the lock settings service 420, which in turn passes it to the security OS 404.

The security OS 404 then replies to the lock settings service 420 with a Success or Failure message, which is passed back along the line to the messaging client 408. In the case of a Failure message, an appropriate failure dialog box or animation is presented by the messaging client 408 on the client device 328.

In the case of a Success message, the new settings are stored in the lockscreen service 418 in operation 806. The new settings may for example relate to the amount of time after the glasses 100 are doffed or there is a loss of proximity between the glasses 100 and the client device 328 that the glasses are locked. Additionally, the lockscreen service 418 can set an alarm at the alarm manager service 422 in operation 810 if required or specified by the new settings. Finally, upon receipt of the Success message, the messaging client 408 updates the UI with any settings that define changes to the UI in operation 808.

FIG. 9 illustrate a sequence diagram for clearing a PIN on secure glasses 100 according to some examples. The sequence diagrams illustrates information flows and calls between components and associated state changes.

The sequence diagram commences with the messaging client 408 requesting the device security state from the lockscreen service 418. In this particular case, the lockscreen service 418 replies to the messaging client 408 with a Secure security state. The messaging client 408 then retrieves the current PIN from the keychain in operation 902 and transmits a Set Security State message to the lockscreen service 418, which includes both the PIN and a clear PIN instruction. The lockscreen service 418 then sends a Clear Lock message to the lock settings service 420. The lock settings service 420 sends a Remove Password message to the security OS 404, which verifies the PIN and, if verified, clears it from the keymaster 406.

The lockscreen service 418 then sends a Verify No PIN message to the lock settings service 420. In response to a Success message from the lock settings service 420, the lockscreen service 418 sends a Set Lock State message to the lock settings service 420 to set the lock state to False. The lockscreen service 418 then clears all the settings in operation 906 and clears any alarms in operation 904.

The lockscreen service 418 then passes a Success message to the messaging client 408, which removes the PIN from the keychain in operation 908.

Figure 10A:
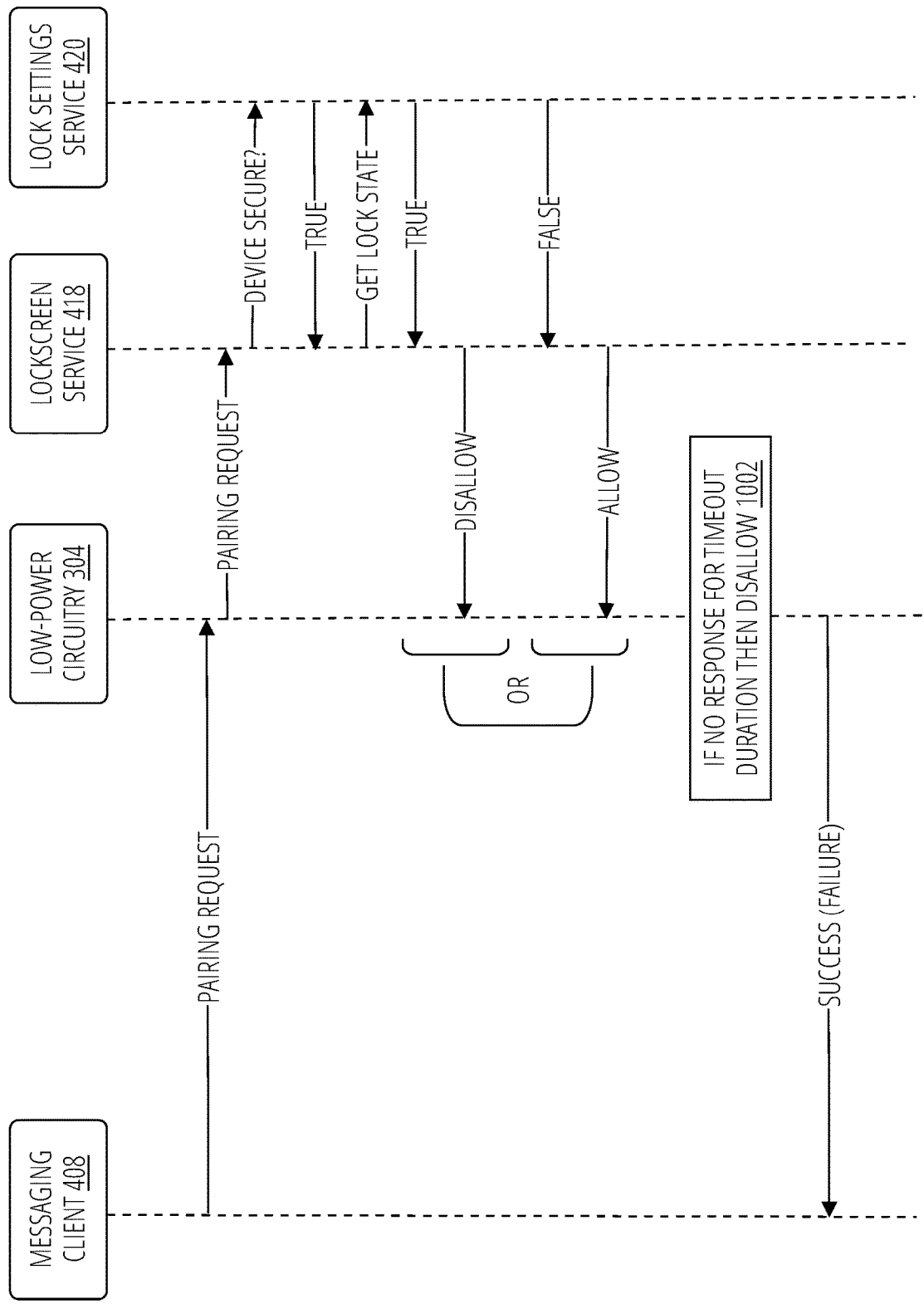
FIG. 10A and FIG. 10B illustrate a sequence diagram for pairing a client device with glasses according to some examples.
Figure 10B:
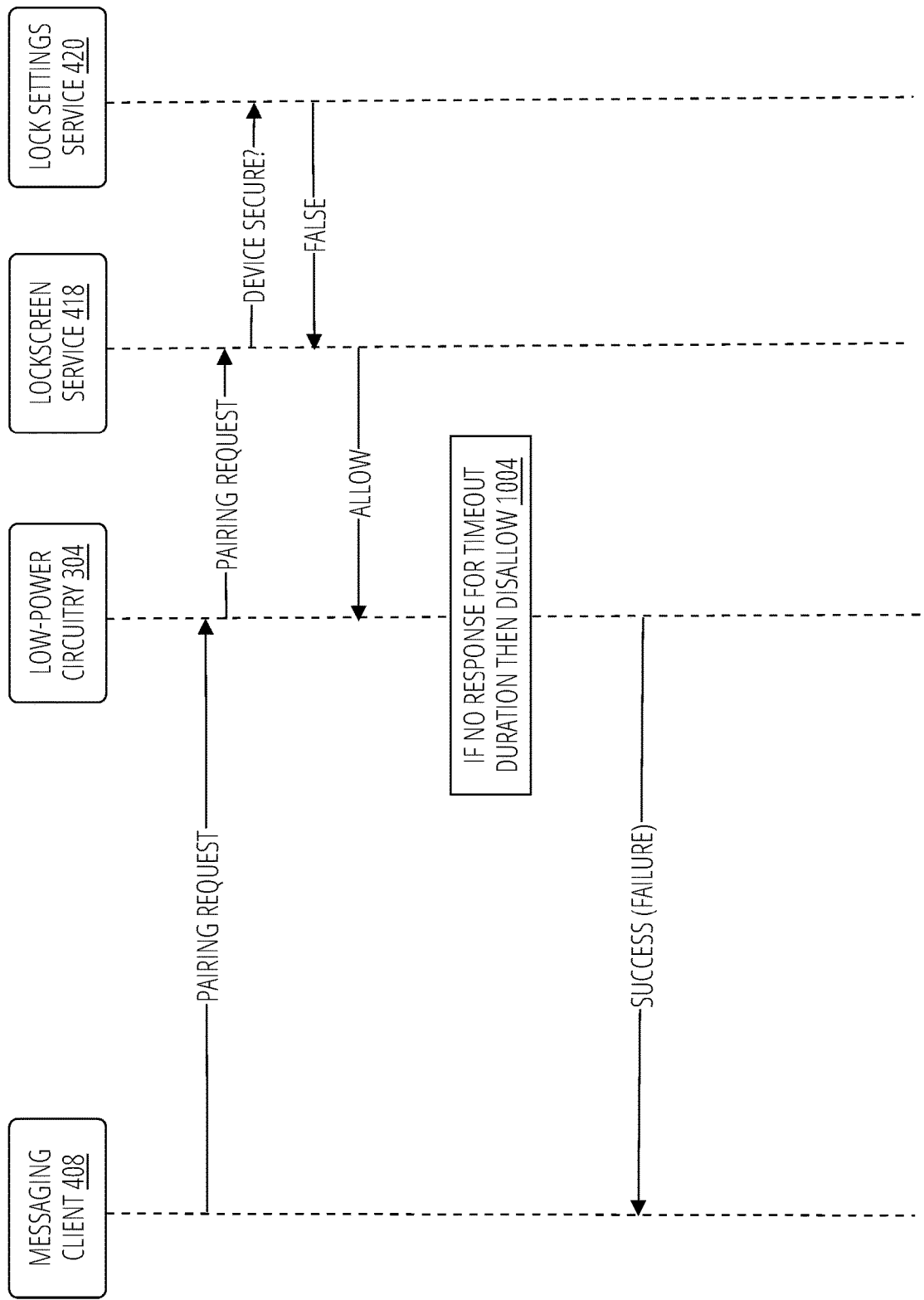

FIG. 10A and FIG. 10B illustrate a sequence diagram for pairing a client device 328 with glasses 100 according to some examples. The sequence diagram illustrates information flows and calls between components and associated state changes.

FIG. 10A illustrates the sequence in the case of secure glasses 100. The messaging client 408 sends a pairing request to the low-power circuitry 304 via the Bluetooth controller 434 and the glasses message service 430. The pairing request is passed to the lockscreen service 418, which inquires from the lock settings service 420 whether or not the glasses 100 are secure. In this case, the lock settings service 420 responds with True, indicating that the glasses are secure. The lockscreen service 418 then sends a Get Lock State message to lock settings service 420 to determine whether or not the glasses are locked.

If the lock settings service 420 responds with True, indicating that the device is locked, the lockscreen service 418 responds to the low-power circuitry 304 with a Disallow message, and pairing does not occur. The low-power circuitry 304 in turn provides a Failure message to the messaging client 408.

If the lock settings service 420 responds with False, indicating that the device is not locked, the lockscreen service 418 responds to the low-power circuitry 304 with an Allow message, and pairing occurs. The low-power circuitry 304 in turn provides a Success message to the messaging client 408.

If there is no response from the lockscreen service 418 to the pairing request for a timeout duration then pairing is disallowed by the low-power circuitry 304 in operation 1002.

FIG. 10B illustrates the sequence in the case of glasses 100 that are not secure. The messaging client 408 sends a pairing request to the low-power circuitry 304 via the Bluetooth controller 434 and the glasses message service 430. The pairing request is passed to the lockscreen service 418, which inquires from the lock settings service 420 whether or not the glasses 100 are secure. In this case, the lock settings service 420 responds with False, indicating that the glasses are not secure. The lockscreen service 418 responds to the low-power circuitry 304 with an Allow message, and pairing occurs. The low-power circuitry 304 in turn provides a Success message to the messaging client 408.

If there is no response from the lockscreen service 418 to the pairing request for a timeout duration then pairing is disallowed by the low-power circuitry 304 in operation 1004.

Figure 11B:
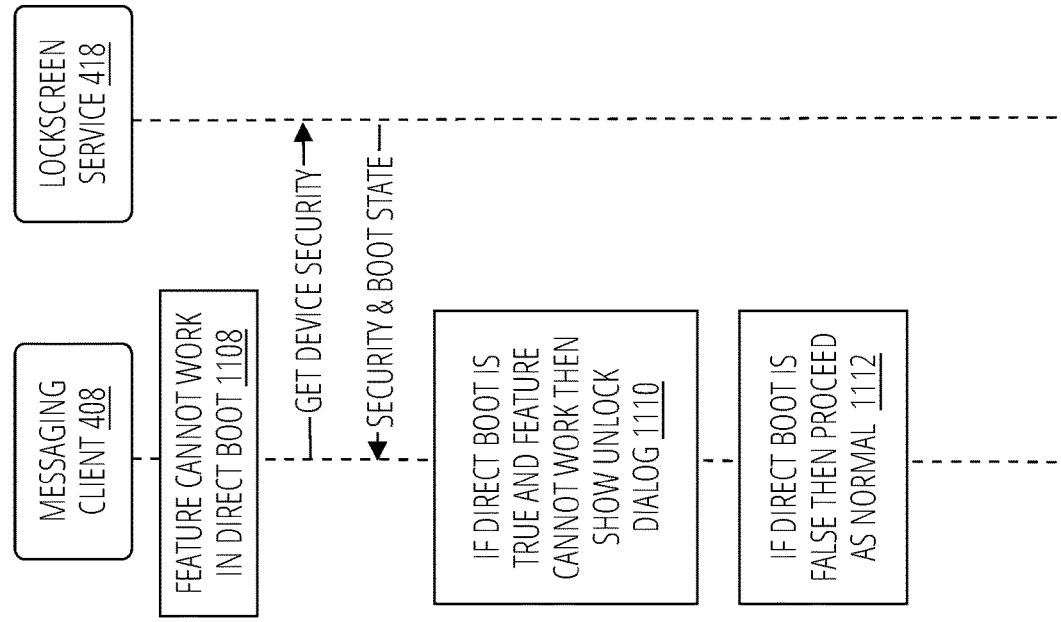
FIG. 11A and FIG. 11B illustrate a sequence diagram relating to the security and boot state of glasses and associated authorizations, according to some examples.
Figure 11A:
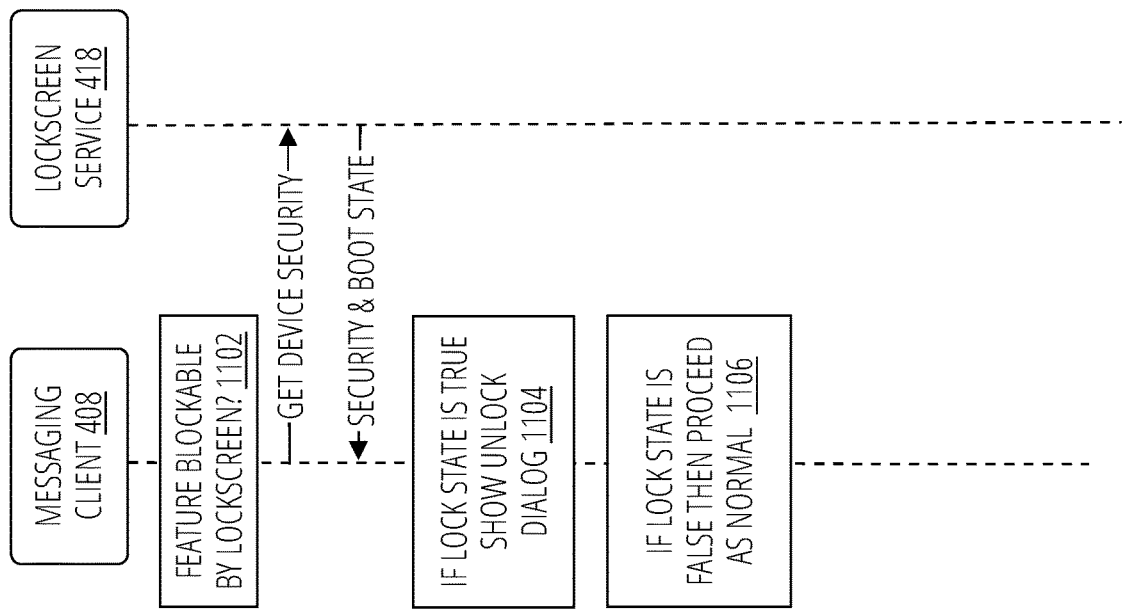

FIG. 11A and FIG. 11B illustrate a sequence diagram relating to the security and boot state of glasses 100 and associated authorizations, according to some examples. The sequence diagram illustrates information flows and calls between components and associated state changes.

In FIG. 11A, the messaging client 408 determines in operation 1102 that a feature that is to be executed is blockable by the lockscreen, that is, the feature is not allowed to run when the glasses 100 are in a secure and locked state. The messaging client 408 then sends a Get Device Security message to the lockscreen service 418. The lockscreen service 418 responds with a message including the glasses 100 security state and boot state.

In operation 1104, if the lock state is True then the unlock dialog box is displayed on either or both of the client device 328 and the glasses 100. In In operation 1104, if the lock state is False then the messaging client 408 proceeds as normal with the feature in operation 1106.

In FIG. 11B, the messaging client 408 determines in operation 1108 that a feature cannot work in direct boot. The messaging client 408 sends a Get Device Security message to the lockscreen service 418. The lockscreen service 418 responds with a message including the glasses 100 security state and boot state.

In operation 1104, if the direct boot state is True and the feature cannot work in direct boot, then the unlock dialog box is displayed on either or both of the client device 328 and the glasses 100 in operation 1110. In operation 1104, if the direct boot state is False then the messaging client 408 proceeds as normal with the feature in operation 1112.

Figure 12:
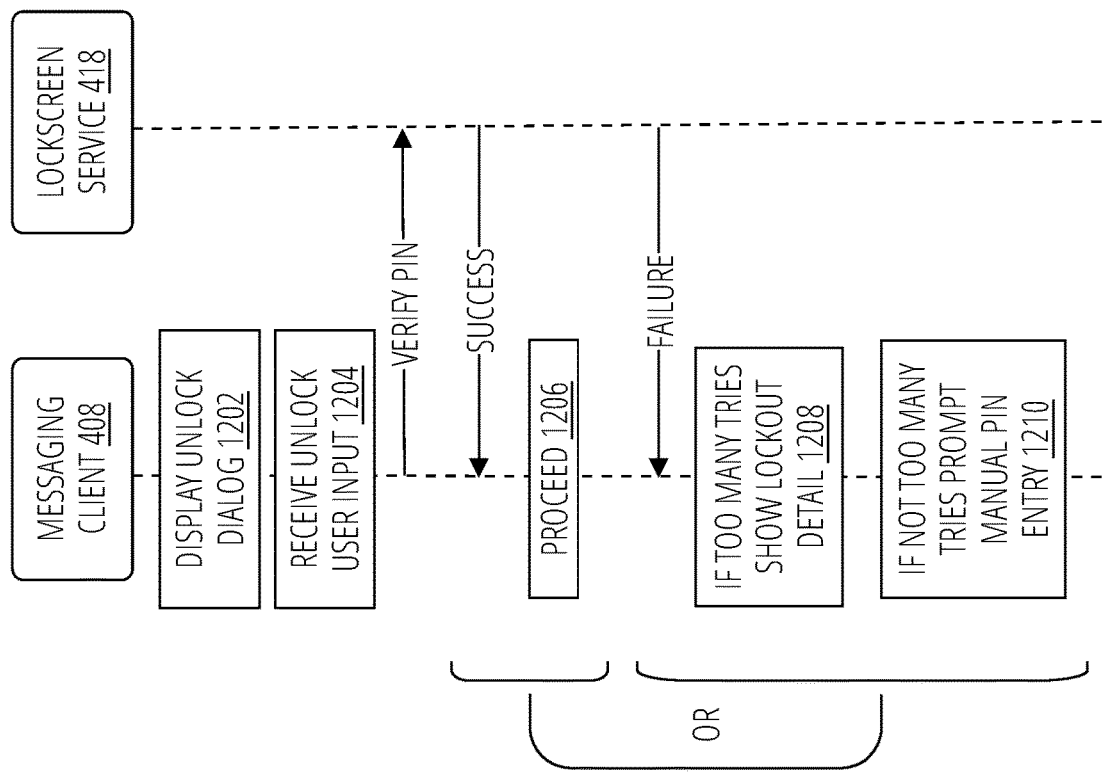
FIG. 12 illustrate a sequence diagram for PIN entry on secure glasses according to some examples

FIG. 12 illustrate a sequence diagram for PIN entry on secure glasses 100 according to some examples. The sequence diagrams illustrates information flows and calls between components and associated state changes.

The sequence starts in operation 1202 with the unlock dialog box being displayed on either or both of the client device 328 and the glasses 100. User input to unlock the glasses 100 is received in operation 1204. The messaging client 408 retrieves the PIN from the keychain and sends a Verify Pin message to the lockscreen service 418. If the lockscreen service 418 responds to the messaging client 408 with a Success message, the messaging client 408 proceeds as normal in operation 1206.

If the lockscreen service 418 responds to the messaging client 408 with a Failure message and the number of tries have exceeded a specified amount, relevant lockout information is displayed on either or both of the client device 328 and the glasses 100 in operation 1208. If the lockscreen service 418 responds to the messaging client 408 with a Failure message and the number of tries have not exceeded the specified amount, a user prompt is displayed on or both of the client device 328 and the glasses 100 for the user to enter the PIN manually in operation 1210.

Figure 13:
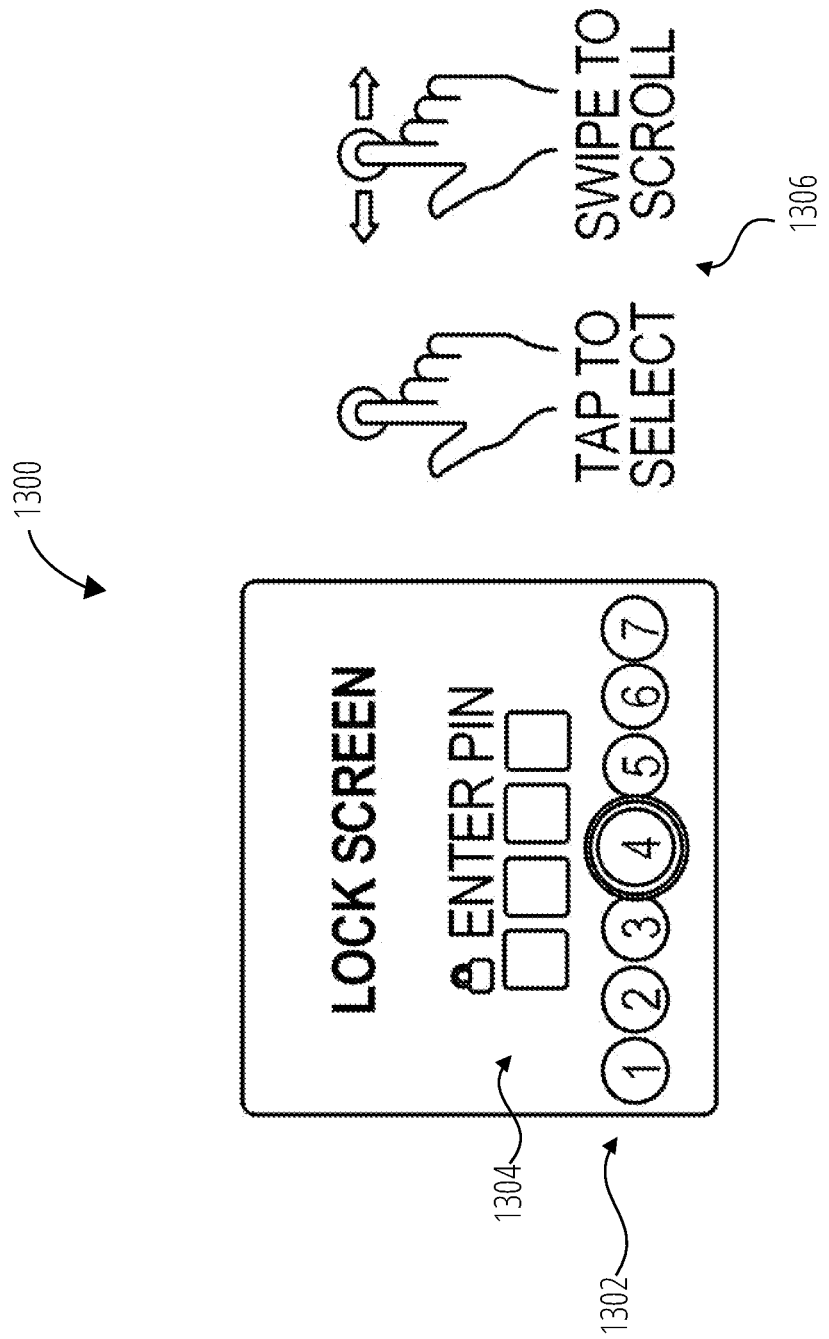
FIG. 13 illustrates a lock screen UI used on the glasses in some examples.

FIG. 13 illustrates a Lock screen UI 1300 used on the glasses 100 in some examples, for manual entry of a PIN. The glasses 100 wake on receipt of a touch input on a touchpad 124 or a press on one of the buttons 126. In response and in some examples if the glasses 100 are locked, lock screen UI 1300 is presented, prompting the entry of a PIN. As can be seen, the lock screen UI 1300 includes a keypad display 1302 and entry fields 1304.

The keypad display 1302 is traversed by forward and backward swipe inputs received on a touchpad 124 and a highlighted number in a central position can be selected for inclusion and display in the entry fields 1304 upon receipt of a tap input on a touchpad 124 as illustrated by tap and swipe inputs 1306. Upon receipt of a correct PIN, the display on the glasses 100 transition to a user interface screen corresponding to the AR functionality of the glasses 100.

Figure 14:
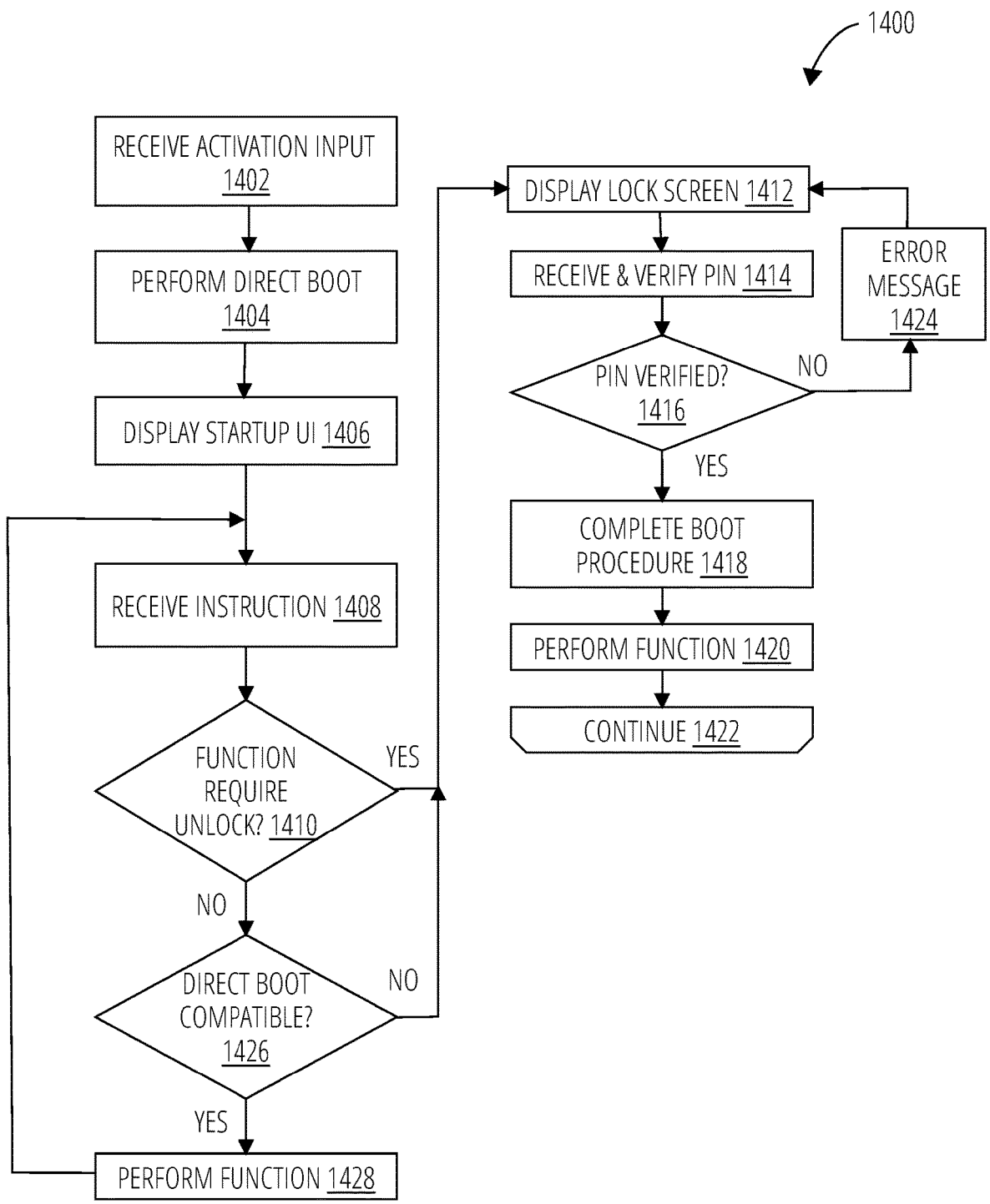
FIG. 14 is a flowchart illustrating operations performed by the glasses and a client device, according to some examples.

FIG. 14 is a flowchart 1400 illustrating operations performed by glasses 100 and client device 328, according to some examples. For explanatory purposes, the operations of the flowchart 1400 are described herein as occurring in serial, or linearly. However, multiple operations of the flowchart 1400 may occur in parallel. In addition, the operations of the flowchart 1400 need not be performed in the order shown and/or one or more blocks of the flowchart 1400 need not be performed and/or can be replaced by other operations.

The method starts at operation 1402 with the glasses 100, which are either in an off state or a sleep state to conserve power, receiving activation input in operation 1402. This could for example be initial power up or the press of a button 126 when in a sleep state.

In response to receiving the activation input, in operation 1404 the glasses 100 perform the direct boot routine discussed above. In direct boot mode, only certain direct-boot-aware applications are capable of execution and are permitted to execute. Direct boot mode is indicated, and the execution of direct-boot-aware applications is triggered, by a LOCKED_BOOT_COMPLETED system status and system status message. Optionally, a start-up UI or a boot screen is displayed by the glasses 100 in operation 1406.

In operation 1408, the glasses 100 receive an instruction to perform a function. This can be transmitted from the client device 328 or be a function indicated by user input on the glasses 100, such as a button press to capture an image or a video.

In operation 1410 the glasses 100 or the client device 328 determine whether or not the function requires the glasses 100 to be unlocked. If so, the method proceeds at operation 1412. If not, the glasses 100 or the client device 328 determine in operation 1426 whether or not the function is direct-boot compatible. If not, the method proceeds at operation 1412. If the function is direct-boot compatible, the function is performed at operation 1428 and the method returns to operation 1408 and proceeds further from there.

If the function requires unlock or is not direct-boot compatible as determined in operation 1410 or operation 1426, the glasses display the lock screen UI to the user in operation 1412. The glasses 100 receive and verify the PIN in operation 1414. This can either be from the keychain on the client device 328 (in response to an "unlock" user input), from manual user input of the PIN on the glasses 100 100 or manual input on the client device 328. If the PIN is not verified, the unlock fails and the glasses 100 display an error message or animation in operation 1424. The method then returns to operation 1412 for manual PIN input. Multiple failed attempts will be handled as discussed above and are not illustrated here for clarity.

If the PIN is verified in operation 1416 then the glasses 100 complete the full boot procedure in operation 1418 and the function is performed in operation 1420. The operation of the glasses then continues as normal in operation 1422.

Examples of functions that are compatible with direct boot, locked or unlocked, are administrative functions such as setting the display brightness of the glasses or the volume of built-in or linked speakers (such as a wireless headset) from the messaging client 408. Examples of functions that that are not compatible with direct boot, locked or unlocked, are higher level functions that do not implicate the privacy of the user or of the device as such, such as capturing a photo or video, checking for a firmware update, or performing a firmware update. Examples of functions that are not compatible with direct boot and locked (that is, available only in the unlocked state) include selecting an augmented reality effect to apply to the video feed from a camera ("Opening a LENS") and sending, posting or uploading a captured image or recorded video.

Networked Computing Environment

Figure 15:
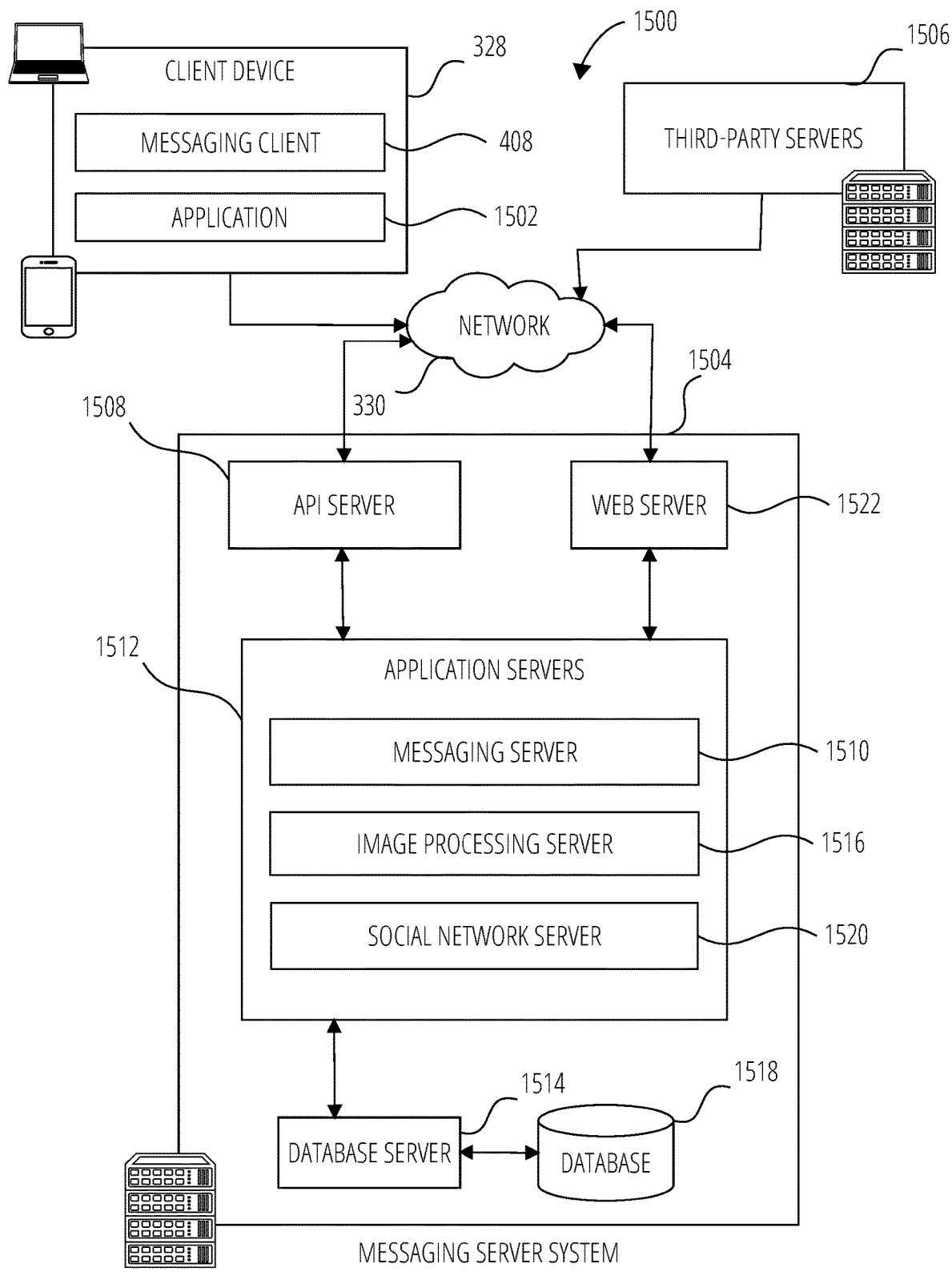
FIG. 15 is a diagrammatic representation of a networked environment in which the present disclosure may be deployed, in accordance with some examples.

FIG. 15 is a block diagram showing an example messaging system 1500 for exchanging data (e.g., messages and associated content) over a network. The messaging system 1500 includes multiple instances of a client device 328, each of which hosts a number of applications, including a messaging client 408 and other applications 1502. Each messaging client 408 is communicatively coupled to other instances of the messaging client 408 (e.g., hosted on respective other client devices 328), a messaging server system 1504 and third-party servers 1506 via a network 330 (e.g., the Internet). A messaging client 408 can also communicate with locally-hosted applications 1502 using Applications Program Interfaces (APIs).

A messaging client 408 is able to communicate and exchange data with other messaging clients 408 and with the messaging server system 1504 via the network 330. The data exchanged between messaging clients 408, and between a messaging client 408 and the messaging server system 1504, includes functions (e.g., commands to invoke functions) as well as payload data (e.g., text, audio, video or other multimedia data).

The messaging server system 1504 provides server-side functionality via the network 330 to a particular messaging client 408. While certain functions of the messaging system 1500 are described herein as being performed by either a messaging client 408 or by the messaging server system 1504, the location of certain functionality either within the messaging client 408 or the messaging server system 1504 may be a design choice. For example, it may be technically preferable to initially deploy certain technology and functionality within the messaging server system 1504 but to later migrate this technology and functionality to the messaging client 408 where a client device 328 has sufficient processing capacity.

The messaging server system 1504 supports various services and operations that are provided to the messaging client 408. Such operations include transmitting data to, receiving data from, and processing data generated by the messaging client 408. This data may include message content, client device information, geolocation information, media augmentation and overlays, message content persistence conditions, social network information, and live event information, as examples. Data exchanges within the messaging system 1500 are invoked and controlled through functions available via user interfaces (UIs) of the messaging client 408.

Turning now specifically to the messaging server system 1504, an Application Program Interface (API) server 1508 is coupled to, and provides a programmatic interface to, application servers 1512. The application servers 1512 are communicatively coupled to a database server 1514, which facilitates access to a database 1518 that stores data associated with messages processed by the application servers 1512. Similarly, a web server 1522 is coupled to the application servers 1512, and provides web-based interfaces to the application servers 1512. To this end, the web server 1522 processes incoming network requests over the Hypertext Transfer Protocol (HTTP) and several other related protocols.

The Application Program Interface (API) server 1508 receives and transmits message data (e.g., commands and message payloads) between the client device 328 and the application servers 1512. Specifically, the Application Program Interface (API) server 1508 provides a set of interfaces (e.g., routines and protocols) that can be called or queried by the messaging client 408 in order to invoke functionality of the application servers 1512. The Application Program Interface (API) server 1508 exposes various functions supported by the application servers 1512, including account registration, login functionality, the sending of messages, via the application servers 1512, from a particular messaging client 408 to another messaging client 408, the sending of media files (e.g., images or video) from a messaging client 408 to a messaging server 1510, and for possible access by another messaging client 408, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 408).

The application servers 1512 host a number of server applications and subsystems, including for example a messaging server 1510, an image processing server 1516, and a social network server 1520. The messaging server 1510 implements a number of message processing technologies and functions, particularly related to the aggregation and other processing of content (e.g., textual and multimedia content) included in messages received from multiple instances of the messaging client 408. As will be described in further detail, the text and media content from multiple sources may be aggregated into collections of content (e.g., called stories or galleries). These collections are then made available to the messaging client 408. Other processor and memory intensive processing of data may also be performed server-side by the messaging server 1510, in view of the hardware requirements for such processing.

The application servers 1512 also include an image processing server 1516 that is dedicated to performing various image processing operations, typically with respect to images or video within the payload of a message sent from or received at the messaging server 1510.

The social network server 1520 supports various social networking functions and services and makes these functions and services available to the messaging server 1510. To this end, the social network server 1520 maintains and accesses an entity graph within the database 1518. Examples of functions and services supported by the social network server 1520 include the identification of other users of the messaging system 1500 with which a particular user has relationships or is "following," and also the identification of other entities and interests of a particular user.

Returning to the messaging client 408, features and functions of an external resource (e.g., an application 1502 or applet) are made available to a user via an interface of the messaging client 408. In this context, "external" refers to the fact that the application 1502 or applet is external to the messaging client 408. The external resource is often provided by a third party but may also be provided by the creator or provider of the messaging client 408. The messaging client 408 receives a user selection of an option to launch or access features of such an external resource. The external resource may be the application 1502 installed on the client device 328 (e.g., a "native app"), or a small-scale version of the application (e.g., an "applet") that is hosted on the client device 328 or remote of the client device 328 (e.g., on third-party servers 1506). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the messaging client 408. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 408 determines whether the selected external resource is a web-based external resource or a locally-installed application 1502. In some cases, applications 1502 that are locally installed on the client device 328 can be launched independently of and separately from the messaging client 408, such as by selecting an icon, corresponding to the application 1502, on a home screen of the client device 328. As used herein, an icon can include one or both of text and graphic elements. Small-scale versions of such applications can be launched or accessed via the messaging client 408 and, in some examples, no or limited portions of the small-scale application can be accessed outside of the messaging client 408. The small-scale application can be launched by the messaging client 408 receiving, from a third-party server 1506 for example, a markup-language document associated with the small-scale application and processing such a document.

In response to determining that the external resource is a locally-installed application 1502, the messaging client 408 instructs the client device 328 to launch the external resource by executing locally-stored code corresponding to the external resource. In response to determining that the external resource is a web-based resource, the messaging client 408 communicates with the third-party servers 1506 (for example) to obtain a markup-language document corresponding to the selected external resource. The messaging client 408 then processes the obtained markup-language document to present the web-based external resource within a user interface of the messaging client 408.

The messaging client 408 can notify a user of the client device 328, or other users related to such a user (e.g., "friends"), of activity taking place in one or more external resources. For example, the messaging client 408 can provide participants in a conversation (e.g., a chat session) in the messaging client 408 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 408, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 408. The external resource can selectively include different media items in the responses, based on a current context of the external resource.

Figure 16:
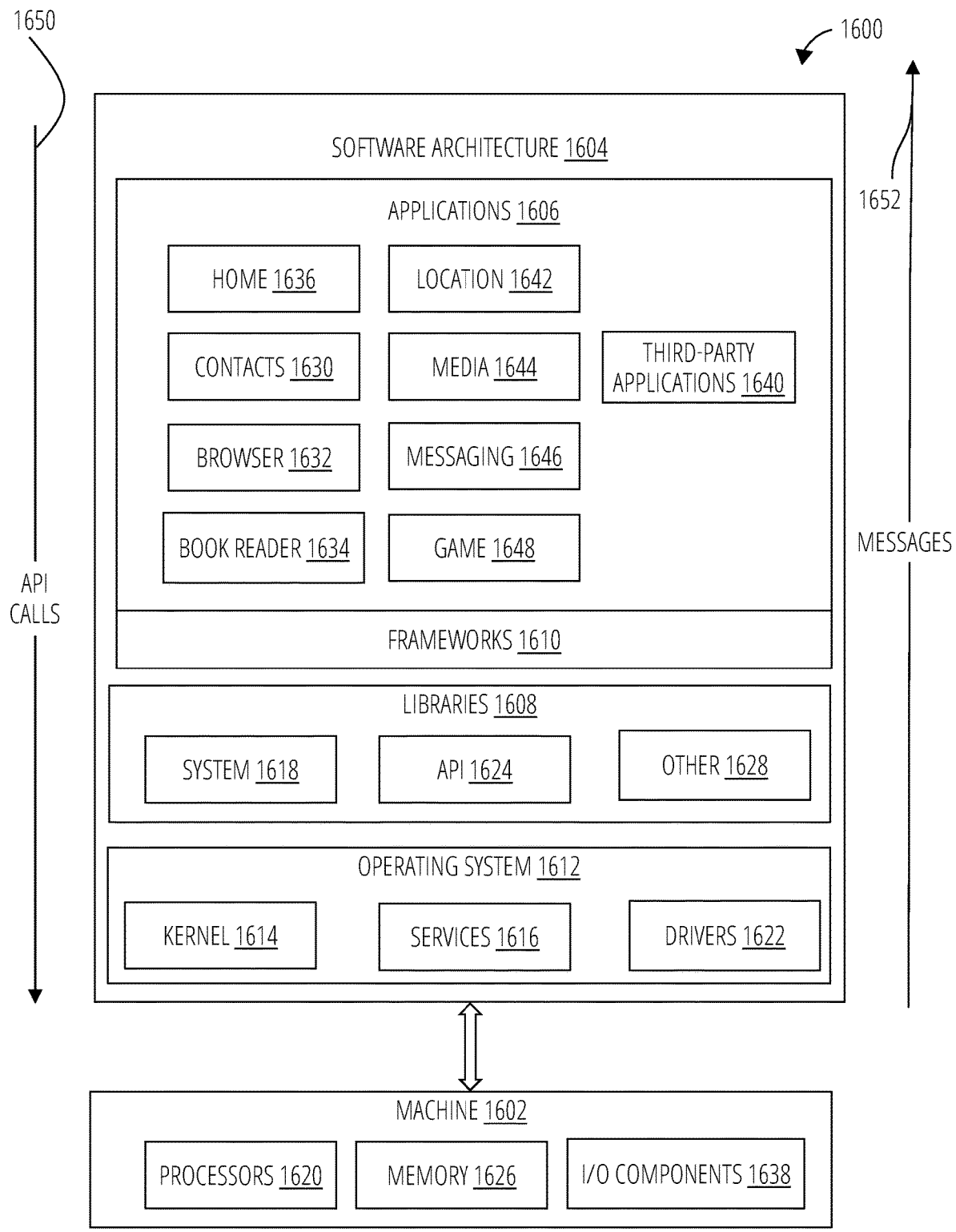
FIG. 16 is block diagram showing a software architecture within which the present disclosure may be implemented, in accordance with some examples.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1608, frameworks 1610, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1608 provide a low-level common infrastructure used by the applications 1606. The libraries 1608 can include system libraries 1618 (e.g., C standard library) that provide functions such as memory allocation functions, string manipulation functions, mathematic functions, and the like. In addition, the libraries 1608 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1608 can also include a wide variety of other libraries 1628 to provide many other APIs to the applications 1606.

The frameworks 1610 provide a high-level common infrastructure that is used by the applications 1606. For example, the frameworks 1610 provide various graphical user interface (GUI) functions, high-level resource management, and high-level location services. The frameworks 1610 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646, a game application 1648, and a broad assortment of other applications such as third-party applications 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party applications 1640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1640 can invoke the API calls 1650 provided by the operating system 1612 to facilitate functionality described herein.

Figure 17:
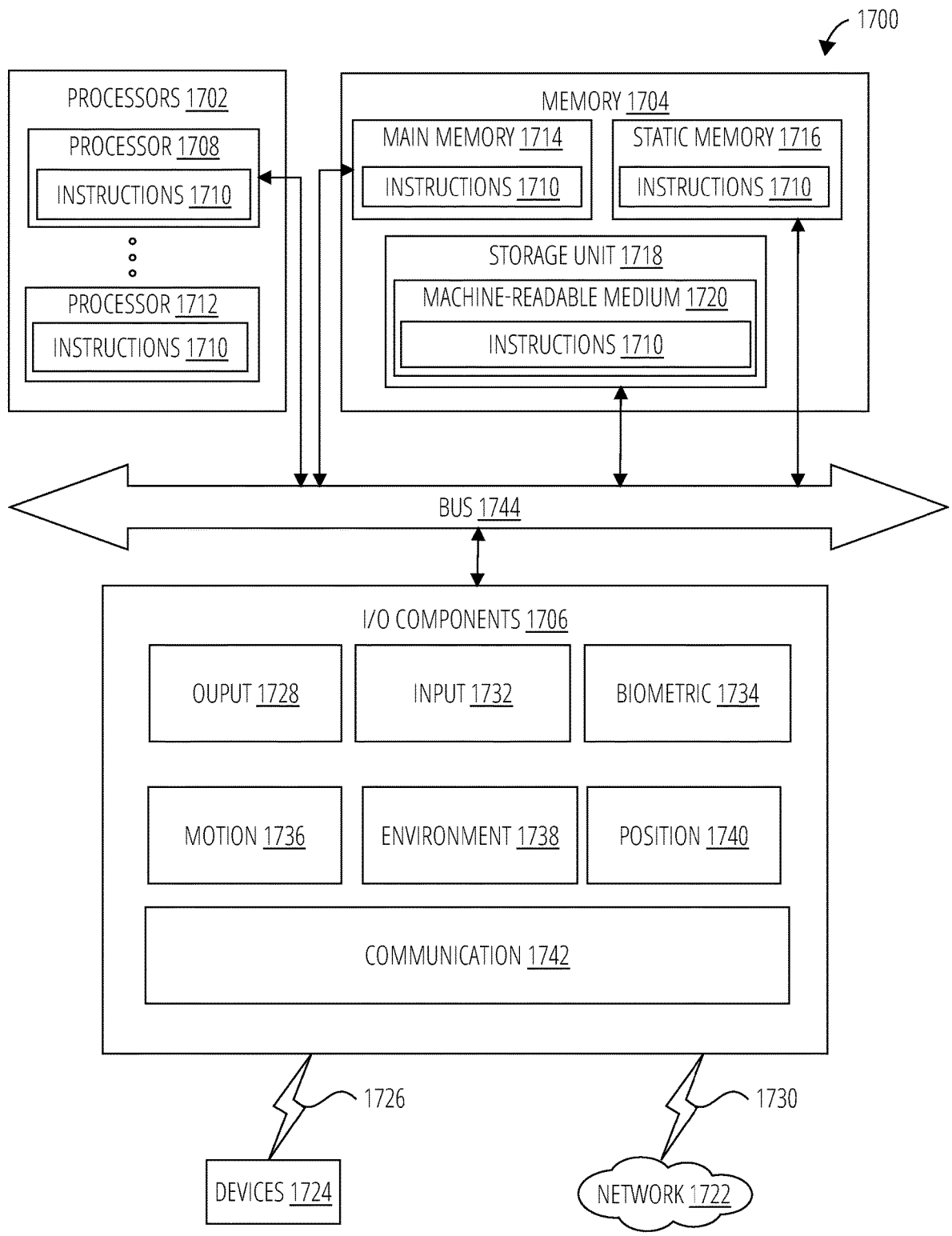
FIG. 17 is a diagrammatic representation of a machine, in the form of a computer system within which a set of instructions may be executed for causing the machine to perform any one or more of the methodologies discussed, in accordance with some examples.

FIG. 17 is a diagrammatic representation of a machine 1700 within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute any one or more of the methods described herein. The instructions 1710 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1702, memory 1704, and I/O components 1706, which may be configured to communicate with each other via a bus 1744. In an example, the processors 1702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1708 and a processor 1712 that execute the instructions 1710. The term "processor" is intended to include multi-core processors that may comprise two or more independent processors (sometimes referred to as "cores") that may execute instructions contemporaneously. Although FIG. 17 shows multiple processors 1702, the machine 1700 may include a single processor with a single core, a single processor with multiple cores (e.g., a multi-core processor), multiple processors with a single core, multiple processors with multiples cores, or any combination thereof.

The memory 1704 includes a main memory 1714, a static memory 1716, and a storage unit 1718, both accessible to the processors 1702 via the bus 1744. The main memory 1704, the static memory 1716, and storage unit 1718 store the instructions 1710 embodying any one or more of the methodologies or functions described herein. The instructions 1710 may also reside, completely or partially, within the main memory 1714, within the static memory 1716, within machine-readable medium 1720 within the storage unit 1718, within at least one of the processors 1702 (e.g., within the processor's cache memory), or any suitable combination thereof, during execution thereof by the networked system 300.

The I/O components 1706 may include a wide variety of components to receive input, provide output, produce output, transmit information, exchange information, capture measurements, and so on. The specific I/O components 1706 that are included in a particular machine will depend on the type of machine. For example, portable machines such as mobile phones may include a touch input device or other such input mechanisms, while a headless server machine will likely not include such a touch input device. It will be appreciated that the I/O components 1706 may include many other components that are not shown in FIG. 17. In various examples, the I/O components 1706 may include output components 1728 and input components 1732. The output components 1728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1732 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1706 may include biometric components 1734, motion components 1736, environmental components 1738, or position components 1740, among a wide array of other components. For example, the biometric components 1734 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1736 include acceleration sensor components (e.g., accelerometer), gravitation sensor components, rotation sensor components (e.g., gyroscope), and so forth. The environmental components 1738 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1740 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1706 further include communication components 1742 operable to couple the networked system 300 to a network 1722 or devices 1724 via a coupling 1730 and a coupling 1726, respectively. For example, the communication components 1742 may include a network interface component or another suitable device to interface with the network 1722. In further examples, the communication components 1742 may include wired communication components, wireless communication components, cellular communication components, Near Field Communication (NFC) components, Bluetooth© components (e.g., Bluetooth© Low Energy), Wi-Fi components, and other communication components to provide communication via other modalities. The devices 1724 may be another machine or any of a wide variety of peripheral devices (e.g., a peripheral device coupled via a USB).

Moreover, the communication components 1742 may detect identifiers or include components operable to detect identifiers. For example, the communication components 1742 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1742, such as location via Internet Protocol (IP) geolocation, location via Wi-Fi® signal triangulation, location via detecting an NFC beacon signal that may indicate a particular location, and so forth.

The various memories (e.g., memory 1704, main memory 1714, static memory 1716, and/or memory of the processors 1702) and/or storage unit 1718 may store one or more sets of instructions and data structures (e.g., software) embodying or used by any one or more of the methodologies or functions described herein. These instructions (e.g., the instructions 1710), when executed by processors 1702, cause various operations to implement the disclosed examples.

The instructions 1710 may be transmitted or received over the network 1722, using a transmission medium, via a network interface device (e.g., a network interface component included in the communication components 1742) and using any one of a number of well-known transfer protocols (e.g., hypertext transfer protocol (HTTP)). Similarly, the instructions 1710 may be transmitted or received using a transmission medium via the coupling 1726 (e.g., a peer-to-peer coupling) to the devices 1724.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method executed by one or more processors in a head-worn device including one or more display devices, the method comprising:
   receiving an activation input;
   performing a partial bootup of the head-worn device;
   receiving an instruction to perform a function;
   determining whether the instruction is permitted for partial bootup execution;
   based on the instruction being permitted for partial bootup execution, executing the instruction; and
   based on the instruction not being permitted for partial bootup execution, completing a bootup of the head-worn device, wherein the method further comprises:
   determining whether the instruction requires user authentication in order to be executed; and
   based on the instruction requiring user authentication, executing a user authentication procedure regardless of whether or not the instruction is partial bootup compatible, the user authentication procedure being performed by a keymaster component running in a trusted execution environment comparing a received password against a stored password.

2. The method of claim 1 further comprising:
   determining whether the instruction requires user authentication in order to be executed; and
   based on the instruction being partial bootup compatible and not requiring user authentication, executing the instruction.

3. The method of claim 1 wherein the partial bootup of the head-worn device includes starting a lockscreen service and a camera service.

4. The method of claim 1, further comprising;
   verifying correct user authentication;
   completing a bootup of the head-worn device; and
   executing the instruction.

5. The method of claim 4 wherein verifying correct user authentication comprises:
   receiving a password from a related mobile device.

6. The method of claim 5 further comprising:
   based on correct user authorization not being verified using the password received from the related mobile device, prompting user input of a password via the head-worn device.

7. The method of claim 5 further comprising:
   maintaining an authenticated state of the head-worn device based on proximity of the head-worn device to the related mobile device.

8. A head-worn device comprising:
   one or more cameras;
   one or more display devices;
   one or more processors; and
   a memory storing instructions that, when executed by the one or more processors, configure the device to perform operations comprising:
   receiving an activation input;
   performing a partial bootup of the head-worn device;
   receiving an instruction to perform a function;
   determining whether the instruction is permitted for partial bootup execution;
   based on the instruction being permitted for partial bootup execution, executing the instruction; and
   based on the instruction not being permitted for partial bootup execution, completing a bootup of the head-worn device, wherein the operations further comprise:
   determining whether the instruction requires user authentication in order to be executed; and
   based on the instruction requiring user authentication, executing a user authentication procedure regardless of whether or not the instruction is partial bootup compatible, the user authentication procedure being performed by a keymaster component running in a trusted execution environment comparing a received password against a stored password.

9. The head-worn device of claim 8, wherein the operations further comprise:
   determining whether the instruction requires user authentication in order to be executed; and
   based on the instruction being partial bootup compatible and not requiring user authentication, executing the instruction.

10. The head-worn device of claim 8, wherein the operations further comprise:
verifying correct user authentication;
completing a bootup of the head-worn device; and
executing the instruction.

11. The head-worn device of claim 10, wherein verifying correct user authentication comprises:
receiving a password from a related mobile device.

12. The head-worn device of claim 11, wherein the operations further comprise:
based on correct user authorization not being verified using the password received from the related mobile device, prompting user input of a password via the head-worn device.

13. The head-worn device of claim 11, wherein the operations further comprise:
maintaining an authenticated state of the head-worn device based on proximity of the head-worn device to the related mobile device.

14. A non-transitory computer-readable storage medium, the computer-readable storage medium including instructions that when executed by a head-worn device including one or more display devices and one or more cameras, cause the head-worn device to perform operations comprising:
receiving an activation input;
performing a partial bootup of the head-worn device;
receiving an instruction to perform a function;
determining whether the instruction is permitted for partial bootup execution;
based on the instruction being permitted for partial bootup execution, executing the instruction; and
based on the instruction not being permitted for partial bootup execution, completing a bootup of the head-worn device, wherein the operations further comprise:
determining whether the instruction requires user authentication in order to be executed; and
based on the instruction requiring user authentication, executing a user authentication procedure regardless of whether or not the instruction is partial bootup compatible, the user authentication procedure being performed by a keymaster component running in a trusted execution environment comparing a received password against a stored password.

15. The non-transitory computer-readable storage medium of claim 14, wherein the operations further comprise:
determining whether the instruction requires user authentication in order to be executed; and
based on the instruction being partial bootup compatible and not requiring user authentication, executing the instruction.

16. The non-transitory computer-readable storage medium of claim 14, wherein the partial bootup of the head-worn device includes starting a lockscreen service and a camera service.

17. The non-transitory computer-readable storage medium of claim 14, wherein the operations further comprise:
verifying correct user authentication;
completing a bootup of the head-worn device; and
executing the instruction.

* * * * *